(12) United States Patent
Takahashi

(10) Patent No.: US 6,265,758 B1
(45) Date of Patent: Jul. 24, 2001

(54) SEMICONDUCTOR ACTIVE ELECTROSTATIC DEVICE

(75) Inventor: Akio Takahashi, Kukizaki-machi (JP)

(73) Assignee: Sel Corporation (JP)

( * ) Notice: Subject to any disclaimer, the term of this patent is extended or adjusted under 35 U.S.C. 154(b) by 0 days.

(21) Appl. No.: 08/062,297

(22) Filed: May 14, 1993

(30) Foreign Application Priority Data

May 19, 1992 (JP) ................................ 4-151385

(51) Int. Cl.$^7$ ............................................ H01L 29/78

(52) U.S. Cl. ............................................... 257/637

(58) Field of Search ...................................... 257/637

(56) References Cited

U.S. PATENT DOCUMENTS

| | | | | |
|---|---|---|---|---|
| 4,190,785 | * | 2/1980 | Kompanek | 310/350 |
| 5,001,381 | | 3/1991 | Watanabe | 310/309 |
| 5,002,900 | | 3/1991 | Watanabe | 437/225 |
| 5,095,346 | * | 3/1992 | Bae et al. | 257/296 |
| 5,262,695 | * | 11/1993 | Kuwano et al. | 310/309 |
| 5,286,998 | * | 2/1994 | Ema | 257/637 |

FOREIGN PATENT DOCUMENTS

| | | |
|---|---|---|
| 63-154072 | 6/1988 | (JP) . |
| 63-154073 | 6/1988 | (JP) . |
| 63-265572 | 11/1988 | (JP) . |
| 2114873 | 4/1990 | (JP) . |
| 3277189 | 12/1990 | (JP) . |

OTHER PUBLICATIONS

Japan Electrostatic Society Report 15, 5 (1991), pp. 381–382, published Sep. 30, 1991, A. Takahashi et al., "Stepped Motor Using Extrinsic Semiconductor".

Szes. M, *Physics of Semiconductor Devices*, 1981, p. 32.*

* cited by examiner

*Primary Examiner*—Stephen D. Meier
(74) *Attorney, Agent, or Firm*—Adams & Wilks

(57) ABSTRACT

A semiconductor electrostatic device for producing an output electrostatic force includes an active element, an opposed field element and a control element. The active element has a semiconductor region containing carriers movable in response to an applied electrostatic field only when the field exceeds a predetermined threshold level. The field element generates the electrostatic field and applies the field to the semiconductor region of the active element. A control element controls the electrostatic field to selectively exceed the threshold level so as to localize the carriers within the semiconductor region to thereby generate an output electrostatic force. The device may be configured to output a useful electrostatic force exceeding the inverse of the squared value of the distance between the active element and the field element. Either the active element or the field element of the semiconductor electrostatic device may be configured to be movable in response to the output electrostatic force and the movable element may be used in many applications requiring a movable element, including a mechanical switch, a valve, an electric switch, or a shutter for an optical device. The electrostatic force may be alternatively be used to attract and fix or test a workpiece. In this configuration, the semiconductor electrostatic device may be used for handling or for testing a workpiece, such as a semiconductor wafer.

82 Claims, 21 Drawing Sheets

SEMICONDUCTOR ACTIVE ELECTROSTATIC DEVICE

BACKGROUND OF THE INVENTION

The present invention relates to a semiconductor active electrostatic device. More particularly, the invention relates to an electro-mechanical converter or an electrostatic actuator utilizing an impurity semiconductor material as an active element effective to generate an electrostatic force when an external electrostatic field exceeds a given threshold to produce a drive torque.

The impurity semiconductor material has useful electrical characteristics specific to behavior of donor electrons or acceptor holes, and is utilized for various electronic components. For example, the Rectifying function of PN junction is utilized in diodes and bipolar transistors. Channel inversion is utilized in insulated gate transistors of the field effect type, which are integrated to form an MOSIC. Further, the piezoelectric effect of the semiconductor material is utilized in mechanical sensors, and the photoelectric effect is utilized in optical sensors. Moreover, the photoelectric effect is utilized in solar cells. In such a manner, research and development of the semiconductor device is conventionally associated to those of logic or intelligence elements, sensor elements and energy elements.

Recently, a mechanical effect has been found as the fourth function of the semiconductor material. In the field of micromachine engineering, an impurity semiconductor material is utilized as a rotor to constitute a semiconductor electrostatic motor. Such a motor is disclosed, for example, in U.S. Pat. No. 5,001,381. The semiconductor electrostatic motor operates in a manner such that an electrostatic field is applied to localize majority carriers contained in the impurity semiconductor of the rotor to thereby generate Coulomb force to obtain rotational drive torque.

The semiconductor electrostatic motor is a significant actuator based on discovery of the mechanical effect of the impurity semiconductor material. In addition to the intelligence function, sensing function and energy source function, the discovery of the mechanical function leads to construction of self-reliant robots or micromachines solely composed of semiconductor material. However, the known semiconductor electrostatic motor is capable of a rather primitive actuator simply responsive to an applied voltage to produce a drive torque. This motor has a rather limited application as an actuator, and is practically utilized only as a drive source. Such a primitive type of actuator lacks sophisticated functions such as a judgement or logic property, information processing property and intelligent property. Therefore, the actuator must be coupled to an external controller such as a computer in order to perform more sophisticated operations.

SUMMARY OF THE INVENTION

In view of the above noted drawbacks of the prior art, an object of the invention is to impart a judgement or logic property, information processing property or intelligent property to the semiconductor electrostatic actuator. The invention provides a semiconductor active electrostatic device comprised of field means for producing an electrostatic field, and active means placed in the electrostatic field and being adapted to induce an active electrostatic force only when the electrostatic field exceeds a certain threshold level. The active means has a semiconductor region containing carriers which are excited by the electrostatic field exceeding the threshold level to localize within the semiconductor region to thereby generate the active electrostatic force.

DETAILED DESCRIPTION OF THE INVENTION

Figure 1A:
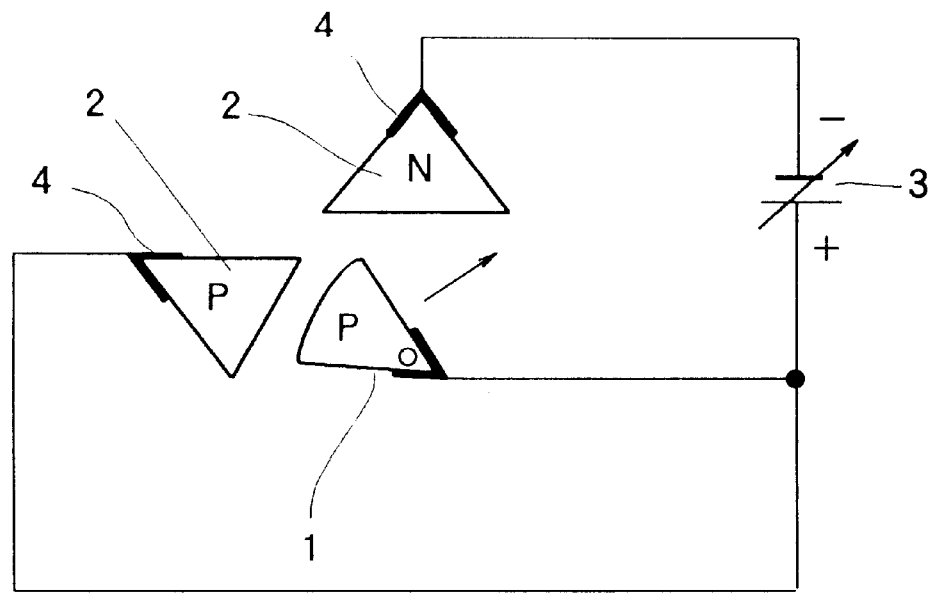
FIGS. 1A and 1B are schematic diagrams showing basic structures of semiconductor active electrostatic devices according to the invention.

Referring to FIG. 1A, the inventive semiconductor active electrostatic device is provided with active means 1 having a semiconductor region containing carriers responsive to an electrostatic field exceeding a certain threshold level to move in a direction of the electrostatic field. Further, field means 2 is provided for applying the electrostatic field to the semiconductor region. Still further, control means 3 is provided to control the electrostatic field to localize the carriers within the semiconductor region when the electrostatic field exceeds the threshold level for generating an electrostatic force. In this embodiment, the field means 2 has an electrode 4 for applying the electrostatic field, while the control means 3 feeds a variable voltage to the electrode 4 to electrically control the electrostatic field. The pair comprised of the active means 1 and the field means 2 comprises a movable member and stationary member such that the movable member converts the generated electrostatic force into a mechanical displacement. Specifically, the active means 1 constitutes the movable member displaceable in a direction indicated by the arrow in response to the generated electrostatic force. Such a movable member can advantageously be utilized as a switch contact piece, shutter piece and valve piece. In this embodiment, the active means 1 is composed of a P type impurity semiconductor material having an impurity density in the order of $10^{15}$ atom/$cm^3$–$10^{21}$ atom/$cm^3$, and is connected to a positive terminal of a variable voltage source which constitutes the control means 3. Further, the field means 2 is composed of an impurity semiconductor material having an impurity density in the order of $10^{15}$ atom/$cm^3$–$10^{21}$ atom/$cm^3$. The field means 2 is composed of a pair of stationary members. The one stationary member is composed of a P type impurity semiconductor material, and is connected to the positive terminal of the control means 3 through the electrode 4. The other stationary member is composed of an N type impurity semiconductor material, and is connected to the negative terminal of the control means 3 through the electrode 4.

In operation of the FIG. 1A device, initially the control means 3 provides an output voltage set to the zero level. The P type movable member is opposed to the P type stationary member by a given gap, and is positioned remotely from the other N type stationary member. Then, the output voltage level of the control means 3 is gradually raised such that an electrostatic field is applied to the respective impurity semiconductor materials. When the electrostatic field exceeds a certain threshold, acceptor holes are excited vastly in the impurity region of the P type movable member to drift to a surface adjacent to the gap so that the excited acceptor holes are localized in a vicinity of the surface. In similar manner, acceptor holes are moved and localized in a vicinity of a surface adjacent to the gap within the impurity semiconductor region of the P type stationary member. A strong electrostatic repulsive force is generated between two layers of the localized acceptor holes opposed to each other through the gap. At this moment, donor electrons are vastly excited from a donor level to a conduction band within a semiconductor region of the other N type stationary member in response to the electrostatic field exceeding a given threshold. The excited donor electrons are driven and localized in a surface of the semiconductor region. A quite strong electrostatic attractive force is induced between the localized donor electrons and acceptor holes. Consequently, the movable member is displaced in the arrow direction by a composite force of the induced electrostatic repulsive and attractive forces.

According to the invention, the movable member is inactive and is held in a dead state until the electrostatic field exceeds the threshold level. When the electrostatic field exceeds the threshold level, movable member instantly responds to undergo the mechanical displacement. The present invention is based on discovery of such a specific property of the impurity semiconductor material when configured in the above-described manner. Hereinafter in this specification, this property is referred to as the "semiconductor mechanical threshold effect". The inventive device based on this effect has obviously a binary judgement function or binary processing function with respect to an external electrostatic field. As well known, the binary processing and judgement is the basic operational principle for all types of Neumann computers. In view of this, the inventive semiconductor active electrostatic device fundamentally possesses information processing ability and even more importantly, an intelligent ability. In order to obtain the semiconductor mechanical threshold effect, the impurity semiconductor material must contain a certain density of impurity, optimumly in the range of $10^{15}$ atom/$cm^3$–$10^{21}$ atom/$cm^3$.

Figure 1B:
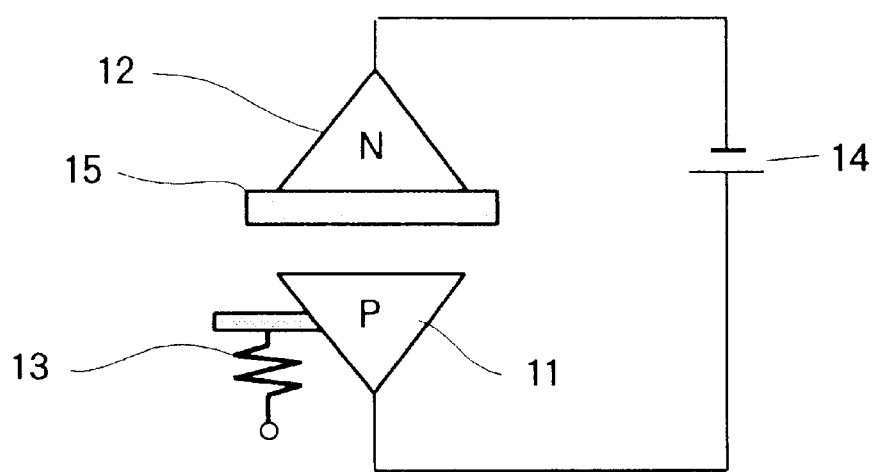

Referring to FIG. 1B, this device is comprised likewise of active means 11 having a semiconductor region containing carriers responsive to an electrostatic field exceeding a threshold level to thereby move in a direction of the electrostatic field, field means 12 for applying an electrostatic field to the semiconductor region, and control means 13 for controlling the electrostatic field to localize the carriers within the semiconductor region when the electrostatic field exceeds the threshold so as to produce an electrostatic force. In this embodiment, the active means 11 constitutes a movable member composed of a P type impurity semiconductor electrically connected to a positive terminal of a constant voltage source 14. The field means 12 constitutes a stationary member composed of an N type impurity semiconductor connected to a negative terminal of the constant voltage source 14. A surface of the field means 12 is covered by an insulating film 15. Specifically, the control means 13 operates to variably regulate a gap distance between the opposed active and field means 11, 12 so as to physically control the electrostatic field.

In operation of the FIG. 1B device, the P type movable member and the N type stationary member are opposed to each other by a given gap. A constant voltage is applied therebetween. This voltage generates an electrostatic field having a magnitude lower than a certain threshold level. Then, the control means 13 is operated to gradually cause the P type movable member to approach the N type stationary member, so that the magnitude of the electrostatic field is effectively increased. When the magnitude exceeds the threshold level, the mobility of acceptor holes is instantly increased within the semiconductor region of the P type movable member so that the acceptor holes are localized in a surface layer adjacent to the gap. On the other hand, the mobility of donor electrons is also instantly increased within the semiconductor region of the N type stationary member so that the donor electrons are localized in a surface layer adjacent to the gap. A sudden electrostatic attractive force is induced between the surface layers opposed to each other through the gap so that the movable member undergoes a mechanical displacement in the electrostatic field direction. Lastly, the movable member contacts the stationary member. Since the insulating film 15 is interposed therebetween, discharge never occurs therebetween. In this embodiment, when the movable member approaches the stationary member within a critical distance, the movable member is turned active to generate the attractive force. Consequently, the FIG. 1B device has distance judgement function or approach judgement function. Such a type of the device can be utilized not only as a mere actuator, but also as an active element of various instruments and systems.

Figure 2:
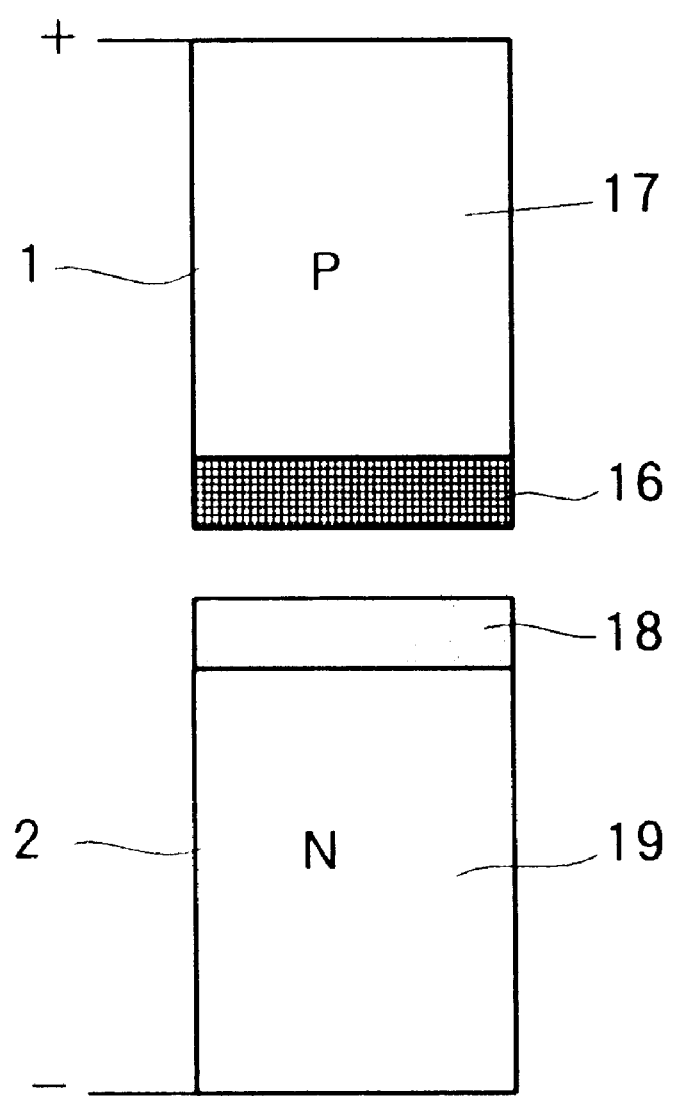
FIG. 2 is an illustrative diagram explanating a principle of the inventive semiconductor active electrostatic device.

Referring to FIG. 2, behavior of carriers will be explained in conjunction with a model of the inventive device. Active means 1 composed of a P type impurity semiconductor is opposed by a given gap to field means 2 composed of an N type impurity semiconductor. A positive voltage is applied to a rear side of the active means 1, while a negative voltage is applied to a rear side of the field means 2, thereby inducing an electrostatic field in the device. When a magnitude of the electrostatic field exceeds a certain threshold level, a vast amount of electrons are excited in the P type impurity semiconductor from a filled band to an acceptor level of a forbidden band, thereby yielding majority carriers comprised of holes. Since the holes can move through a conduction band, the holes are localized to form a high density layer 16 in a vicinity of a front surface adjacent to the gap, by undergoing repulsion of the positive voltage. After the holes are localized, a bulk portion of the P type impurity region forms a region 17 containing ionized impurity. On the other hand, a vast amount of donor electrons are excited when the electrostatic field exceeds the threshold level in the N type impurity semiconductor of the field means 2 from a forbidden band to a conduction band to thereby increase mobility. Consequently, majority carriers of comprised electrons undergo repulsion by the negative voltage to localize in a vicinity of a front surface adjacent to the gap to thereby form a high density layer 18 of the confined electrons. At this stage, donor impurity is positively ionized in a bulk portion of the N type impurity semiconductor. In a transient period of the voltage application, external electrons are supplied to this bulk portion to form a neutral region 19 in which the once ionized donor impurity is neutralized. Consequently, an electrostatic attractive force is generated between the high density layer 16 comprised of holes and the opposed high density layer 18 comprised of electrons. The actual magnitude of the generated attractive force is far greater than a theoretical value calculated according to Coulomb's law. The generated attractive force is inversely proportional to more than the square of the gap distance. This is a quite remarkable phenomenon specific to the behavior of majority carriers localized in a surface of the impurity semiconductor. Though, both of the active and field means are composed of impurity semiconductor materials in the above described model device, the invention is not limited to such a construction. For example, the field means may be composed of a metal electrode for simply applying an electrostatic field. Further, both of the active and the field means may be composed of an impurity semiconductor material of the same conductivity type, which is also effective to achieve the semiconductor mechanical threshold effect.

Figure 3:
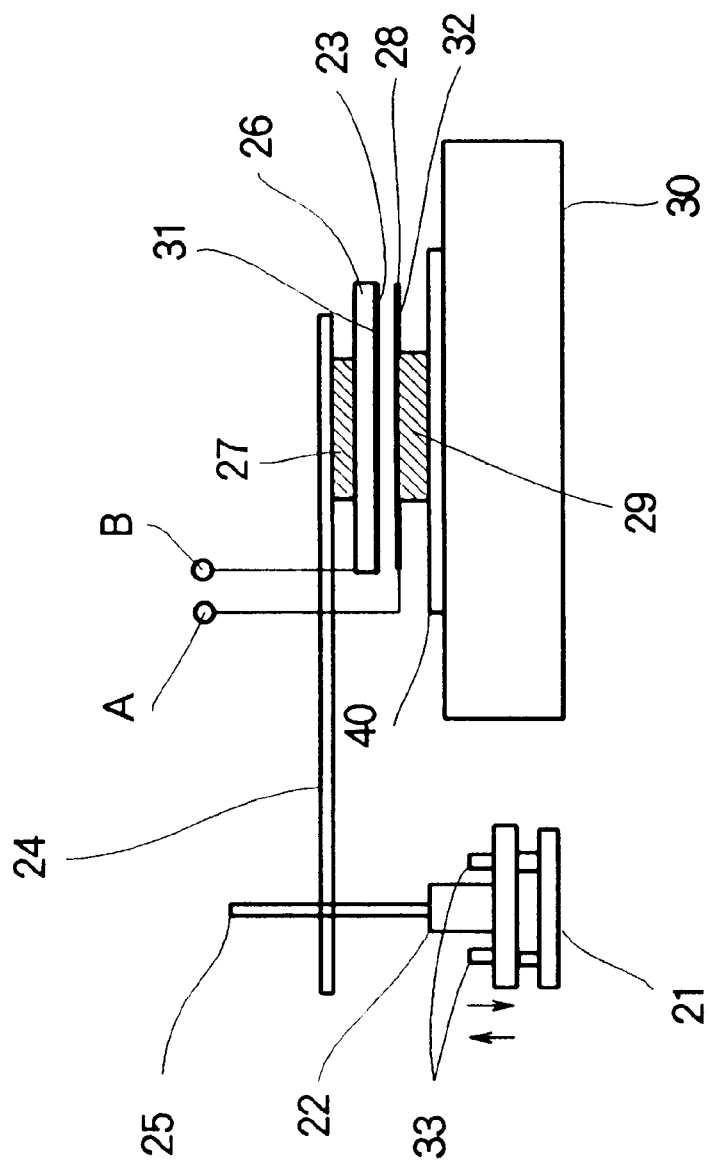
FIG. 3 is a side view of an experimental type of the semiconductor active electrostatic device for evaluation of semiconductor mechanical threshold effect.

Referring to FIG. 3, an experimental device is constructed to evaluate the semiconductor mechanical threshold effect which is the basic principle of the invention. An adjustable block 21 is provided to mount thereon a magnet base 22. A counter wafer 23 (field means) is attached to the magnet base 22 by means of a support beam 24 and a support post 25. The counter wafer 23 is fixed to the horizontal support beam 24 by means of a glass reinforcement 26 and a support plate 27. An active wafer 28 is opposed in parallel to the counter wafer 23. This active wafer 28 is mounted on a pad 40 of an electric balance 30 by means of a support plate 29. The pad 40 is locked to avoid vertical shift upon receipt of a load weight, so that a gap is held constant between the counter wafer 23 and the active wafer 28 during measurement of a load weight.

A gold film 31 is deposited over a back face of the counter wafer 23. Similarly, a gold film 32 is formed over a back face of the active wafer 28. The gold film 32 of the active wafer 28 is connected to a fine copper wire of 50 $\mu$m diameter to provide a terminal A. The other gold film 31 of the counter wafer 23 is connected to an insulated code to provide another terminal B. The weight of the counter wafer 23 is not applied to the balance 30 so that the ordinary insulated code is used as the lead terminal B. The adjustable block 21 is provided with micrometers 33 for finely setting a gap distance in the $\mu$m order between the active wafer 28 and the counter wafer 23.

Figure 4:
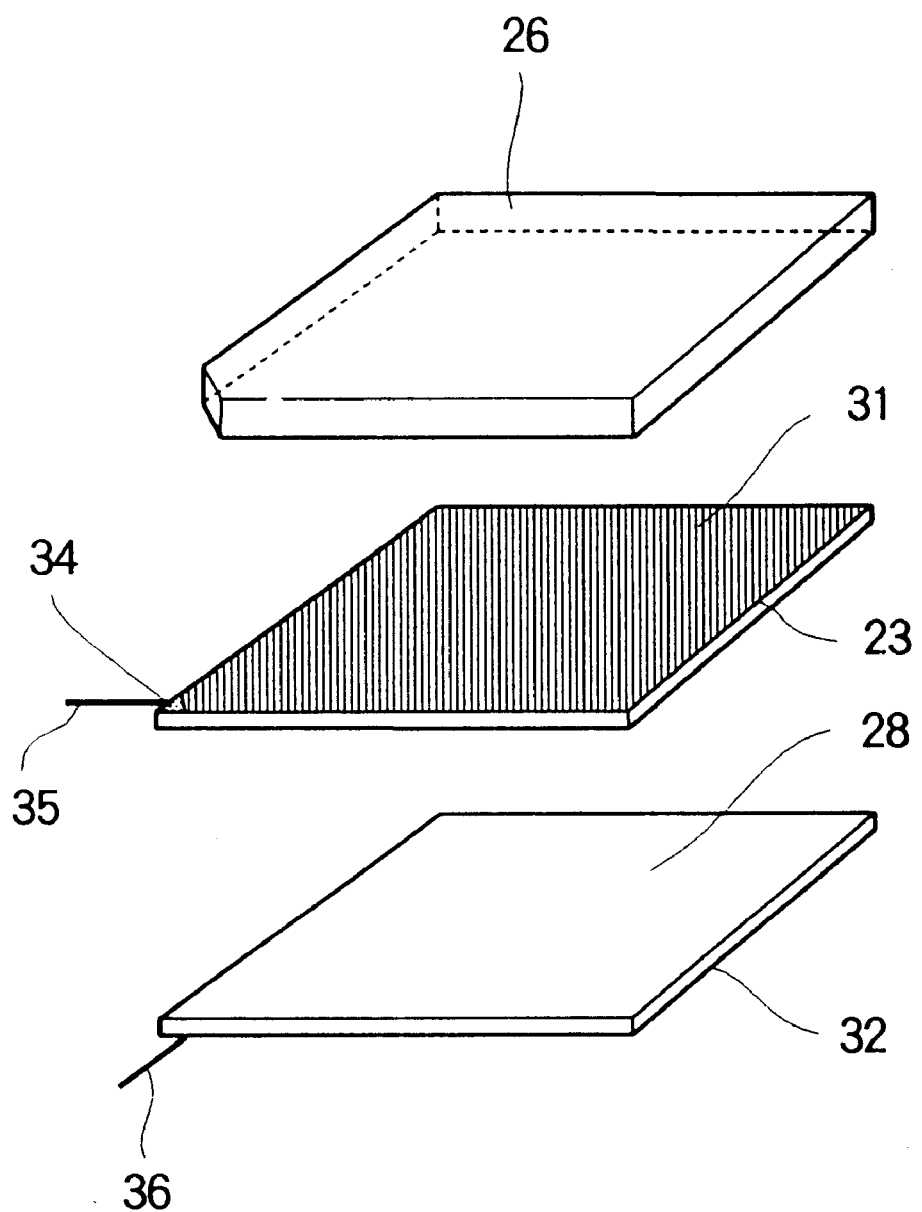
FIG. 4 is an exploded view showing sample pieces used in the FIG. 3 device.

Referring to FIG. 4, both of the counter wafer 23 and the active wafer 28 are composed of an identical sample piece having 50 mm×50 mm size of square shape, 0.2 mm of thickness, and 1.15 g of weight. As mentioned before, the gold film 31 is evaporated over the back face of the counter wafer 23. Similarly, the gold film 32 is evaporated over the back face of the active wafer 28. A lead wire 35 is drawn from the gold film 31 by means of a conductive adhesive 34 to provide the terminal B. Similarly, a lead wire 36 is drawn from the other gold film 32 to provide the terminal A.

Figure 5:
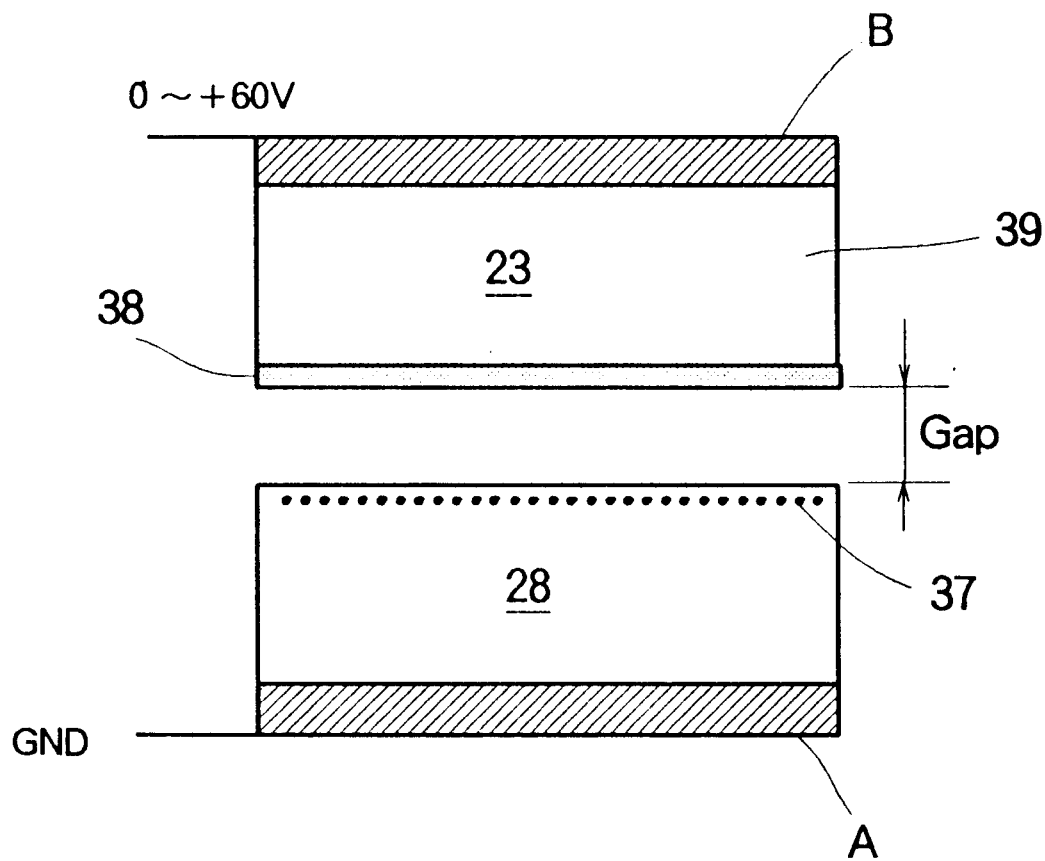
FIG. 5 is an illustrative diagram showing test condition of the FIG. 3 device.

Referring to FIG. 5, experiment conditions will be explained. Three kinds of samples were prepared for the active wafer. The sample 1 is composed of an N type semiconductor having about $10^{18}$ atom/cm$^3$ of donor density and 0.015–0.005 $\Omega$cm of resistivity. The sample 2 is likewise composed of an N type semiconductor having about $10^{15}$ atom/cm$^3$ of donor density, and 1–100 $\Omega$cm of resistivity. The sample 3 is composed of an intrinsic semiconductor having more than 1000 $\Omega$cm of resistivity. On the other hand, corresponding three kinds of samples are prepared for the counter wafer 23. The corresponding samples of the active and counter wafers are used in a pair. All of the semiconductor materials are composed of silicon in this embodiment.

The gap is set to 125 $\mu$m between the active wafer 28 and the counter wafer 23. In this setting, the terminal A of the active wafer 28 is held at a ground level GND, while the terminal B of the counter wafer 23 is applied with a variable voltage in the range of 0 through +60 V. Then, the load weight value of the electric balance is read to measure an electrostatic attractive force induced between both the wafers. As described before, when the applied electrostatic field exceeds a certain threshold level, majority carriers of electrons are localized in a front surface of the active wafer 28 composed of the N type silicon, to form a high density region 37 of the majority carrier. On the other hand, an inversion region 38 or depletion layer is formed in a front surface of the counter wafer 23 while its internal or bulk portion is turned to a neutral region 39. Consequently, an electrostatic attractive force is induced between the high density region 37 of the majority carrier and the inversion region 38.

The measurement results are shown in the following table. The vertical column denotes sample numbers and the horizontal row denotes applied voltage. The load weight is measured in terms of mg unit. The measured data has a negative value because the electrostatic attractive force acts on the electric balance in a tension direction by lifting manner.

TABLE

| DC (V) No. | 0 | 10 | 20 | 30 | 40 | 50 | 60 |
|---|---|---|---|---|---|---|---|
| Sample 1 | 0 | −25 | −92 | −221 | −1162 | −1732 | −2043 |
| Sample 2 | 0 | −20 | −72 | −204 | −657 | −1205 | −1534 |
| Sample 3 | 0 | −17 | −62 | −138 | −241 | −374 | −523 |

Figure 6:
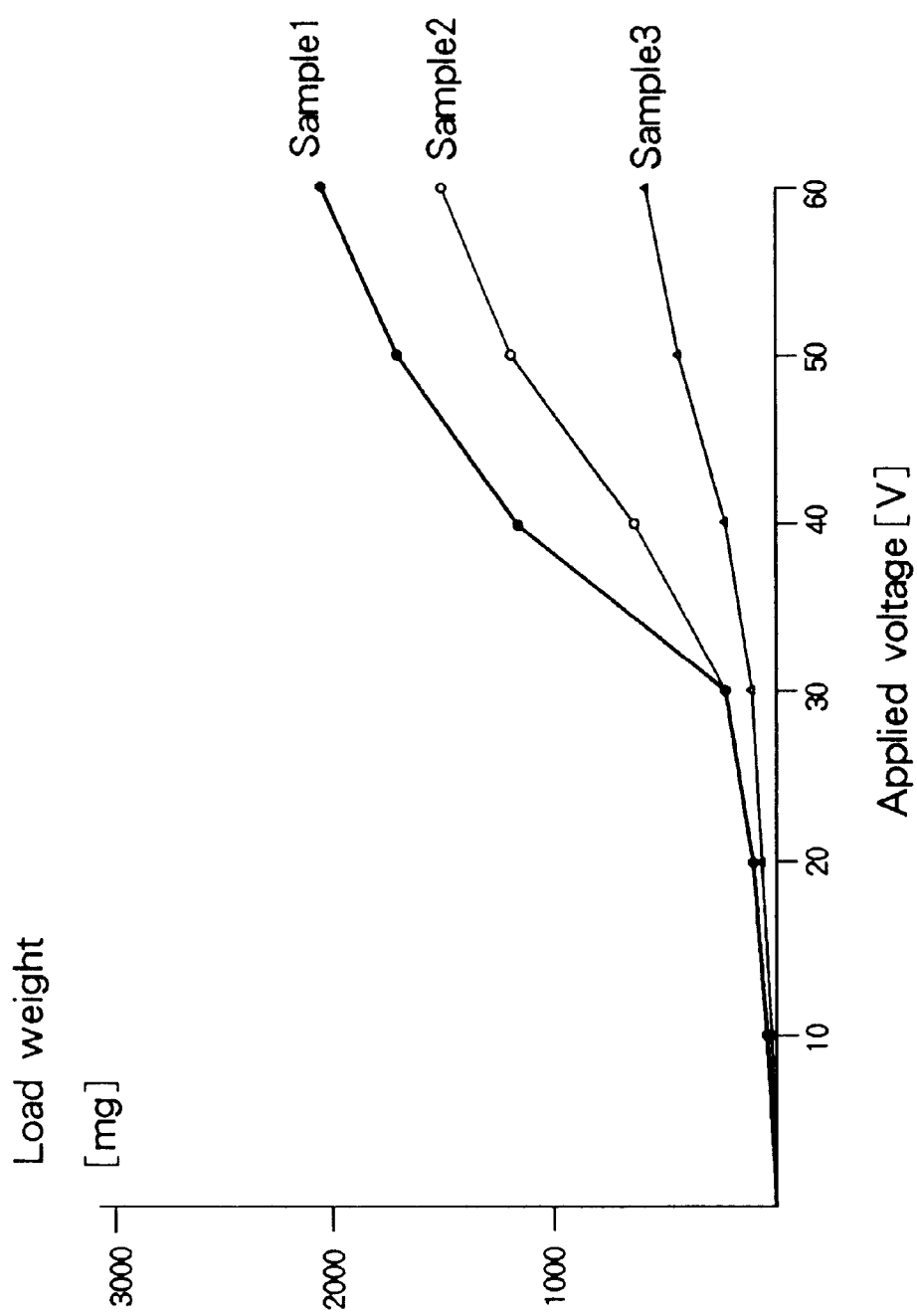
FIG. 6 is a graph showing measurement results obtained by the FIG. 3 experimental device.

Referring to FIG. 6, the measurement results of the above table are illustrated in a graph. The vertical axis denotes an electrostatic attractive force measured in terms of the load weight (mg), and the horizontal axis denotes the applied voltage (V). With respect of the sample 3 composed of intrinsic semiconductor, as seen from the measured curve, the electrostatic attractive force gradually increases as the applied voltage is raised. No threshold characteristic is observed. With regard to the sample 2 composed of N type semiconductor having $10^{15}$ atom/cm$^3$ of impurity density, the electrostatic attractive force characteristically increases over 30 V of the applied voltage. It is found that the semiconductor mechanical threshold effect is obtained due to behavior of the majority carrier in a range of the impurity density over $10^{15}$ atom/cm$^3$. Further, the sample 1 has $10^{18}$ atom/cm$^3$ of the impurity density. The electrostatic attractive force is sharply raised around 30 V to exhibit a quite remarkable threshold characteristic. In this manner, the semiconductor mechanical threshold effect becomes remarkable as the impurity density increases. However, the practical doping rate of the impurity is limited to $10^{21}$ atom/cm$^3$.

Next, the relation between the gap and the attractive force is examined. Using the sample 1, the voltage of 150 V is applied while the gap is set to 500 μm so that the attractive force of −231 mg is obtained. Under the same condition, the gap is reduced to 250 μm so that the attractive force increases to −3140 mg which is 12.46 times as much as −231 mg. Such a relation between the gap and the electrostatic force is seriously deviated from the established Coulomb's law. This law states that Coulomb force is inversely proportional to square of distance. According to the Coulomb's law, the electrostatic attractive force should be four times as much while the gap is reduced by half to 250 μm from 500 μm. However, the attractive force increases more than ten times as much in fact. Such a sharp rise of the electrostatic force is associated with the behavior of the majority carrier contained in the impurity semiconductor. The reduction of the gap is equivalent to an increase in applied voltage. According to the reduction of the gap, the magnitude of the electrostatic field exceeds the certain threshold, so that the electrostatic force increases sharply out of the Coulomb's law. In such a manner, the semiconductor mechanical threshold effect is not predicted by the conventional Coulomb's law, but is quite a significant discovery in physics.

Figure 7:
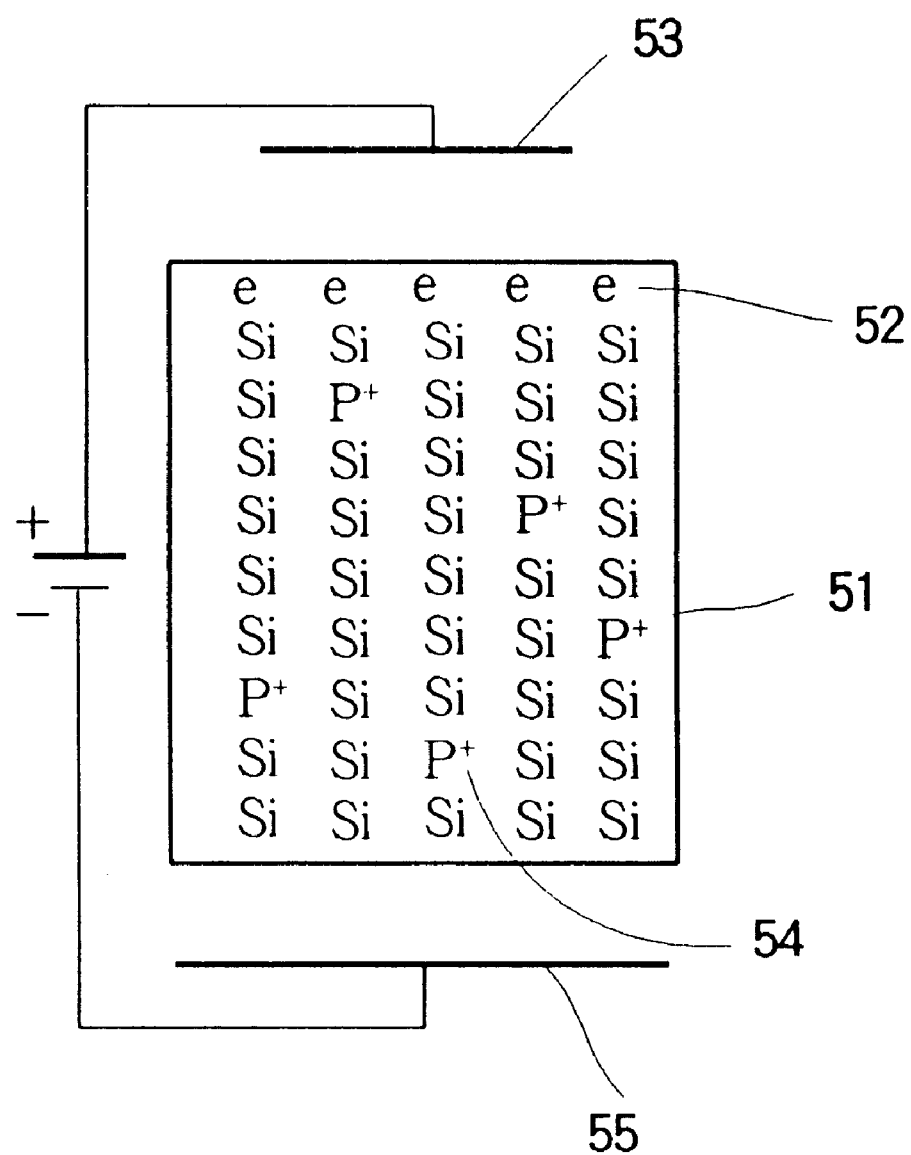
FIG. 7 is an illustrative diagram explanating the basic principle of the invention.

Referring to FIG. 7, behavior of the majority carrier is discussed in greater detail. An impurity semiconductor piece is placed in a uniform electrostatic field. An N type semiconductor piece 51 is doped with phosphorus as a donor. When a magnitude of the uniform field exceeds a given threshold, an electron group 52 of the majority carrier is drawn by an electrode 53 held at a positive potential to thereby localize in one surface region of the semiconductor piece 51. On the other hand, positively ionized phosphorus 54 cannot be moved physically. In such a state, the electrostatic attractive force induced between the collected electron group 52 of the majority carrier and the positive electrode 53 is greater than the other electrostatic attractive force induced between the scattered positive ions and another electrode 55 held at a negative potential. Consequently, a net attractive force acts toward the positive electrode 53 so that the N type semiconductor piece 51 is drawn to the electrode 53.

Figure 8:
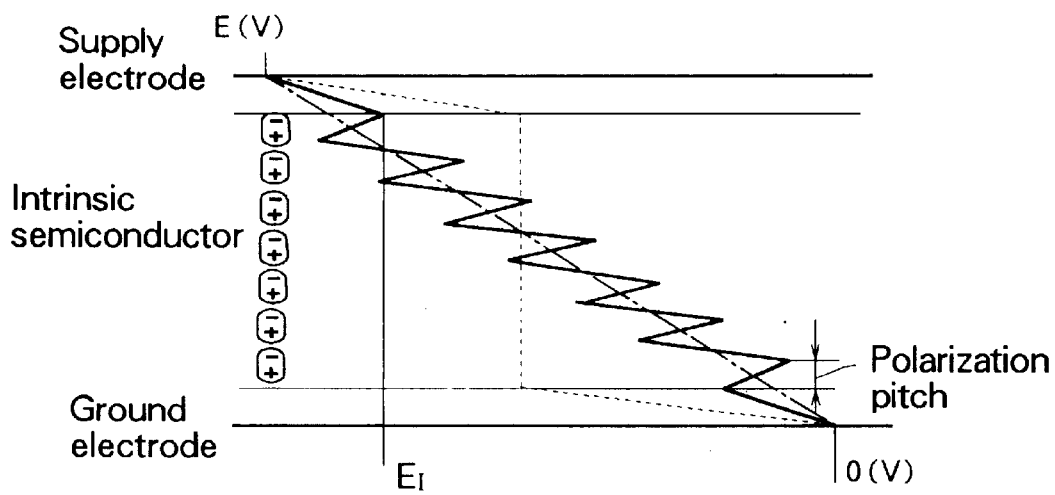
FIG. 8 is an illustrative diagram likewise explanating the basic principle.

Referring to FIG. 8, distribution of an electric field is illustrated within an intrinsic semiconductor disposed between a pair of parallel electrodes. The intrinsic semiconductor having a relative dielectric constant of 11.8 is polarized in the electric field as indicated by the solid line. For illustrative purpose, seven layers of polarized dipoles are contained in the semiconductor. A dot chain curve indicates another electric field distribution provided that the semiconductor has the dielectric constant of value 1. In this case, the electric field linearly varies from E (V) of a supply electrode to 0 (V) of a ground electrode. In case of a conductor, an electric field distribution is indicated by the dashed curve since the conductor has an equal potential in a bulk portion. As indicated by the solid curve, the electric field is distributed in the intrinsic semiconductor such that the electric potential is shifted toward the 0 (V) level at the top surface as compared to the dot chain curve which indicates the case of dielectric constant "1", by a minus component of polarized charge (dipole). Then, the electric potential is reversely deviated toward the supply electrode potential E (V) by a plus component of the polarized charge. This potential swing is repeated each polarization pitch to thereby gradually approach toward the ground potential 0 (V). At the bottom surface of the intrinsic semiconductor, the electric potential is shifted toward the supply electrode potential E (V) as compared to the dot chain curve by a plus component of the polarized charge. The electric potential then reaches the ground potential 0 (V) through a gap. As understood from the above description, the surface potential of the intrinsic semiconductor opposed to the supply electrode falls to a level $E_I$ (V) by a minus component of the polarized charge, as compared to the case of the dielectric constant 1.

Figure 9:
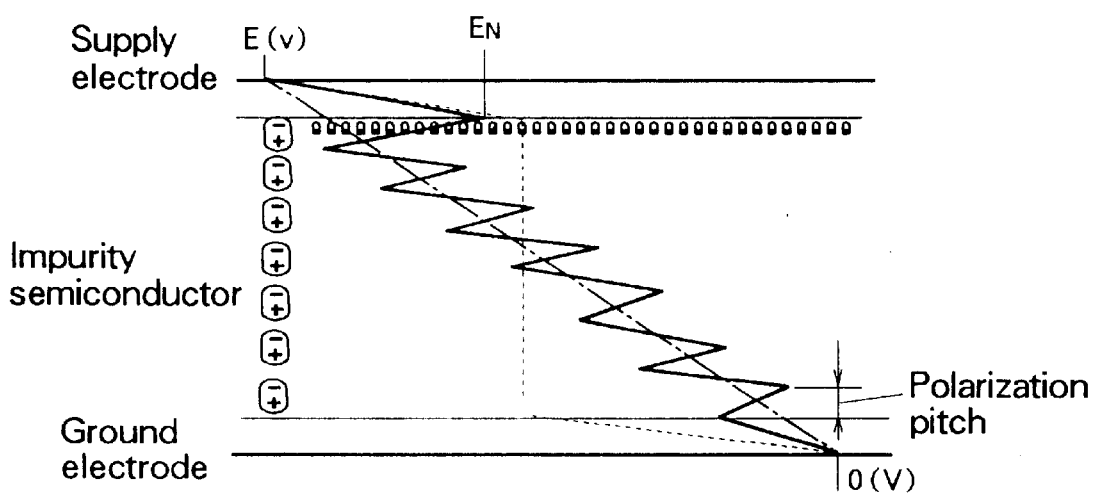
FIG. 9 is an illustrative diagram likewise explanating the basic principle.

Referring to FIG. 9, an electric potential distribution is indicated within an N type impurity semiconductor disposed between a pair of parallel electrodes. Likewise the intrinsic semiconductor, the impurity semiconductor is polarized by a given dielectric constant to exhibit a potential distribution indicated by the solid curve within bulk, in a manner similar to that of the intrinsic semiconductor. However, an electron group of the majority carrier is collected at a top surface adjacent to the supply electrode, hence the surface potential is shifted toward the 0 (V) level at a level $E_N$ (V) which is close to the surface potential of the conductor indicated by the dashed line. The electric field varies within the bulk by a given polarization pitch determined by the dielectric constant. At the bottom surface, the potential is shifted toward E (V) by a plus component of the polarized charge, as compared to the dot and chain curve which indicates the case of dielectric constant 1. Then, the potential reaches to the ground potential 0 (V). As understood from the above explanation, the significant potential drop $E_N$ (V) is generated on the top surface of the impurity semiconductor due to the localization of the electron group. This electric field intensity $E_N$ (V) is far greater than the surface electric field intensity $E_I$ (V) of the intrinsic semiconductor. The electric field intensity $E_N$ (V) is a cause of the remarkable active electrostatic force far greater than a theoretical value calculated according to Coulomb's law.

According to the discussion in conjunction with FIGS. 8 and 9, an electrostatic force induced between the supply electrode and a conductor surface may be greater than the active electrostatic force induced between the supply electrode and the impurity semiconductor surface. However, in contrast to the semiconductor, discharge may occur easily between the conductors, thereby hindering the realization of a practical electrostatic device. The impurity semiconductor can generate a significant electrostatic force due to behavior of the majority carrier while preventing discharge which would cause serious defect in a practical device. In contrast to free electrons in the conductor, the majority carrier of the impurity semiconductor is bound to the surface.

Figure 10A:
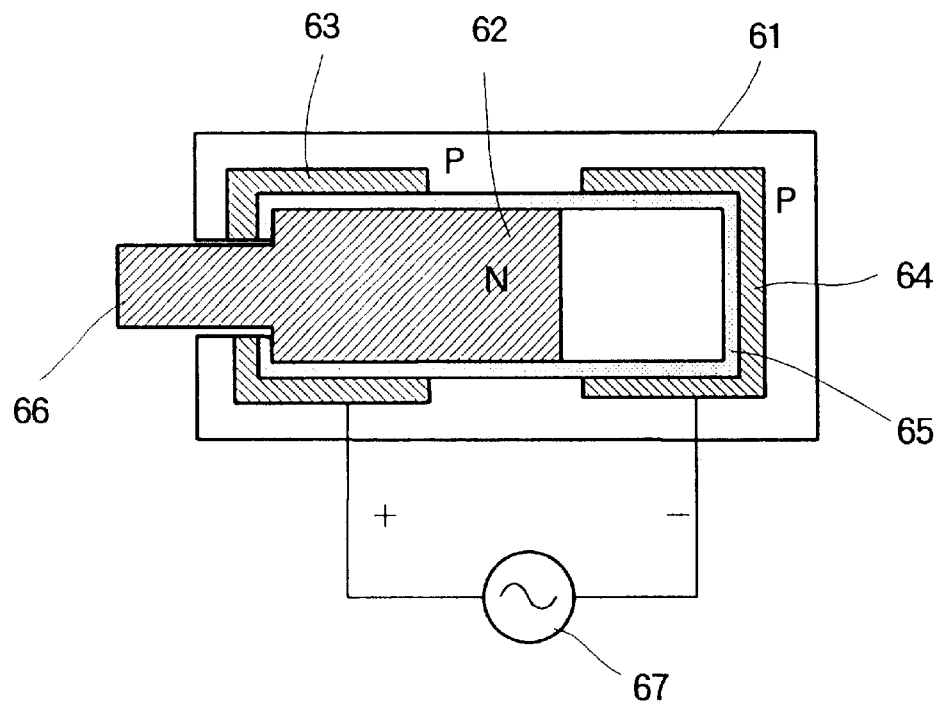
FIGS. 10A and 10B are a schematic diagram showing one embodiment of a bistable actuator according to the invention.
Figure 10B:
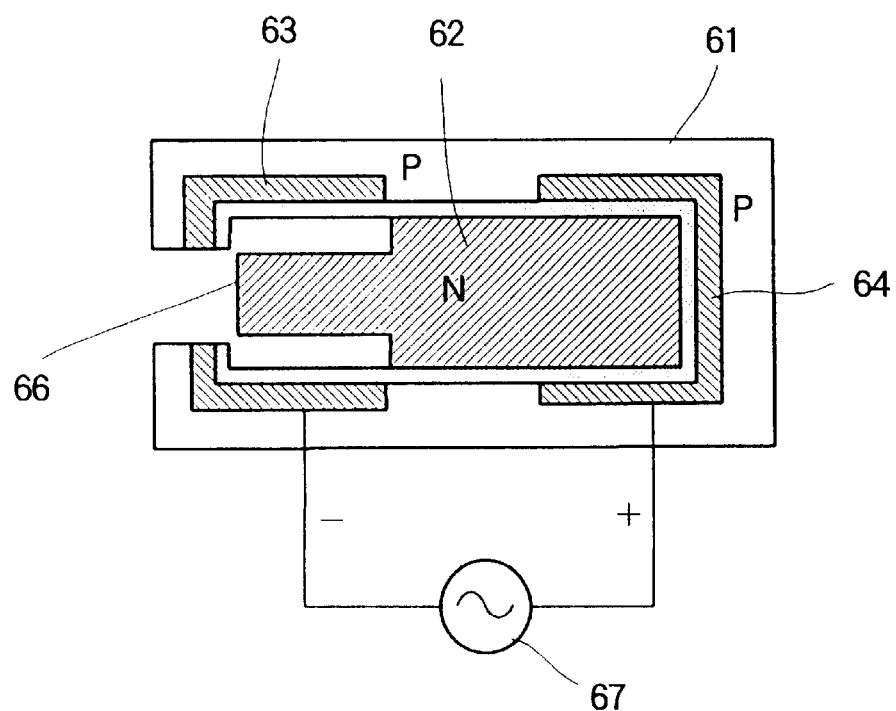

Referring to FIGS. 10A and 10B, a bistable actuator is constructed from the semiconductor active electrostatic device according to the invention. The actuator is composed of a cylinder 61 and a piston 62. The cylinder 61 is formed on its inner wall with a pair of stationary electrodes 63, 64 spaced axially from each other. Each stationary electrode is comprised of a P type impurity semiconductor region. Such an impurity semiconductor region can be formed by diffusing a P type impurity into the inner wall of the cylinder 61 made of intrinsic semiconductor material. Alternatively, the impurity semiconductor region may be formed of a semiconductor thin film. The pair of stationary electrodes 63, 64 are coated by an insulating film 65 having certain lubricity. On the other hand, the piston 62 is composed of an N type impurity semiconductor material. The piston 62 is disposed movably in the axial direction within the cylinder 61. A tip end 66 of the piston 62 is protruded from an opening formed on an end portion of the cylinder 61. A bipolar voltage source 67 is connected across the pair of stationary electrodes 63, 64.

In operation, under the FIG. 10A state, a drive voltage of the positive polarity exceeding a given threshold level is applied between the pair of stationary electrodes 63, 64 so that the piston 62 is attracted to the one stationary electrode 63. Namely, an electrostatic attractive force is induced in the insulating film 65 between electrons localized in the outer surface of the piston 62 and holes localized in the inner surface of the stationary electrode 63, so that the piston 62 is held in a first stable state. In this state, the tip end 66 of the piston 62 is protruded, hence this state is referred to as "advanced state".

Referring to FIG. 10B, the bipolar voltage source 67 is switched so that a negative voltage is applied reversely across the pair of stationary electrodes 63, 64. Consequently, the piston 62 is attracted to the rear stationary electrode 64 to thereby switch to the other stable state. In this state, the tip end 66 of the piston 62 is retracted inside the cylinder 61, hence this state is referred to as "retracted state". By such a manner, the polarity of the voltage source 67 is switched so that the piston 62 displaces between the advanced and retracted states. As long as the absolute value of the applied voltage does not exceed a given threshold, the piston is held stationary to thereby provide the bistable actuator. This actuator may be driven by a continuous bipolar voltage having a given frequency to function as a micro pump.

Figure 11:
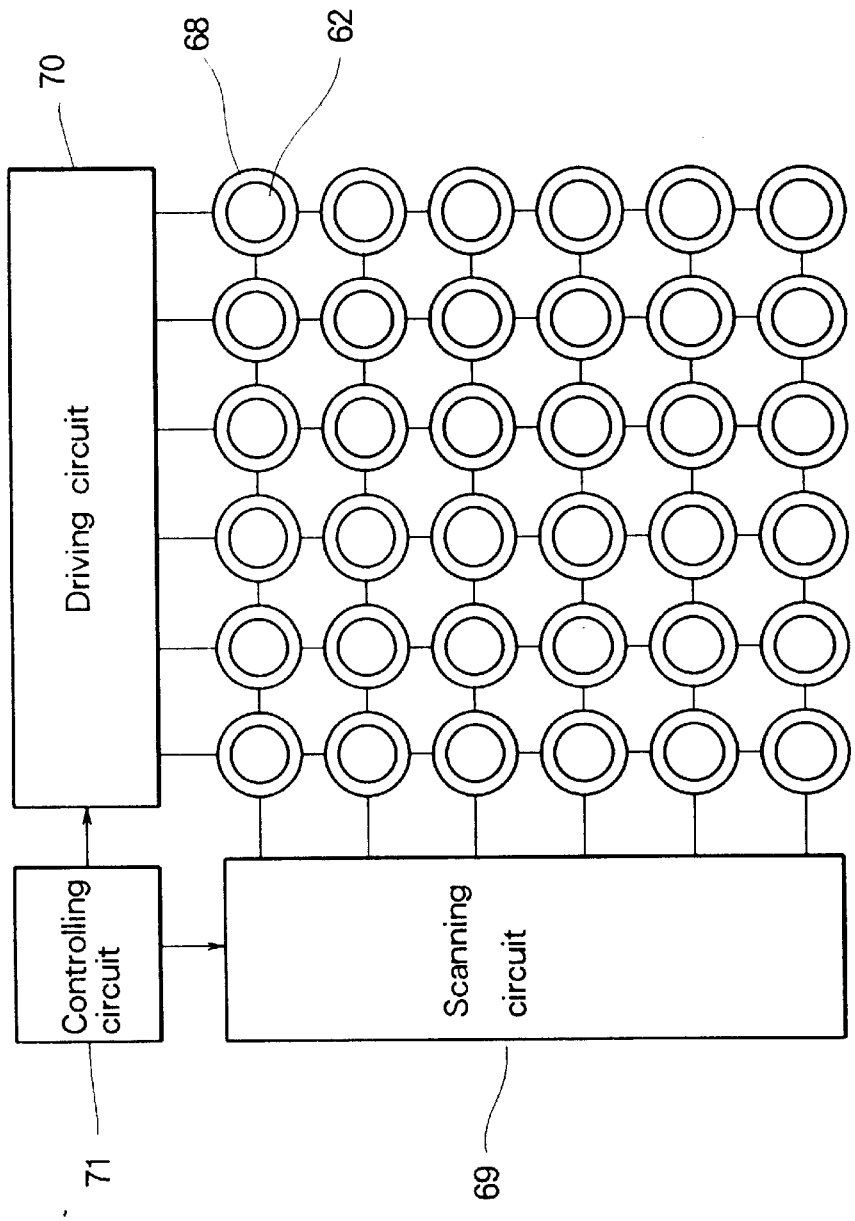
FIG. 11 is a schematic diagram showing one application of the bistable actuator shown in FIGS. 10A and 10B.

Referring to FIG. 11, a plurality of micro bistable actuators 68 are integrated in matrix to form an actuator array. A scanning circuit 69 is connected to every row of the micro bistable actuators 68 to select each row line-sequentially. On the other hand, a driving circuit 70 is connected to every column of the micro bistable actuators 68 to drive each column. A controlling circuit 71 is connected between the scanning circuit 69 and the driving circuit 70 to synchronously control the selection and drive of the actuator array.

In operation of the actuator array, the scanning circuit 69 is driven to sequentially select each row of the micro bipolar actuators 68 line by line. In synchronization, the driving circuit 70 applies a drive voltage of the negative polarity exceeding a given threshold level to all of the micro bistable actuators 68 to place their pistons 62 in the retracted state to thereby reset the actuator array. Then, the scanning circuit 69 is again operated to sequentially select each row of the micro bistable actuators 68, while the driving circuit 70 applies an analog drive voltage of the positive polarity to every row of the micro bistable actuators 68. When a selected micro bistable actuator 68 receives the positive analog drive voltage exceeding the threshold level, the selected micro bistable actuator 68 switches from the retracted state to the advanced state. By such a manner, the analog drive voltage is sampled line-sequentially so that the actuator array instantly carries out binarizing process to memorize the sampled signal in the form of the state of each piston 62. For example, in case that a video signal or image data signal is applied as the analog drive voltage, the actuator array can record a binarily processed image in the form of a matrix arrangement of advanced and retracted picture elements. Such an actuator array recording the image can be utilized for a printing block. Otherwise, the actuator array can be driven continuously to function as a printing head of a dot printing machine. Further, the actuator array can be used as a moving display for the blind who can sense the displayed image by touching the array surface.

Figure 12A:
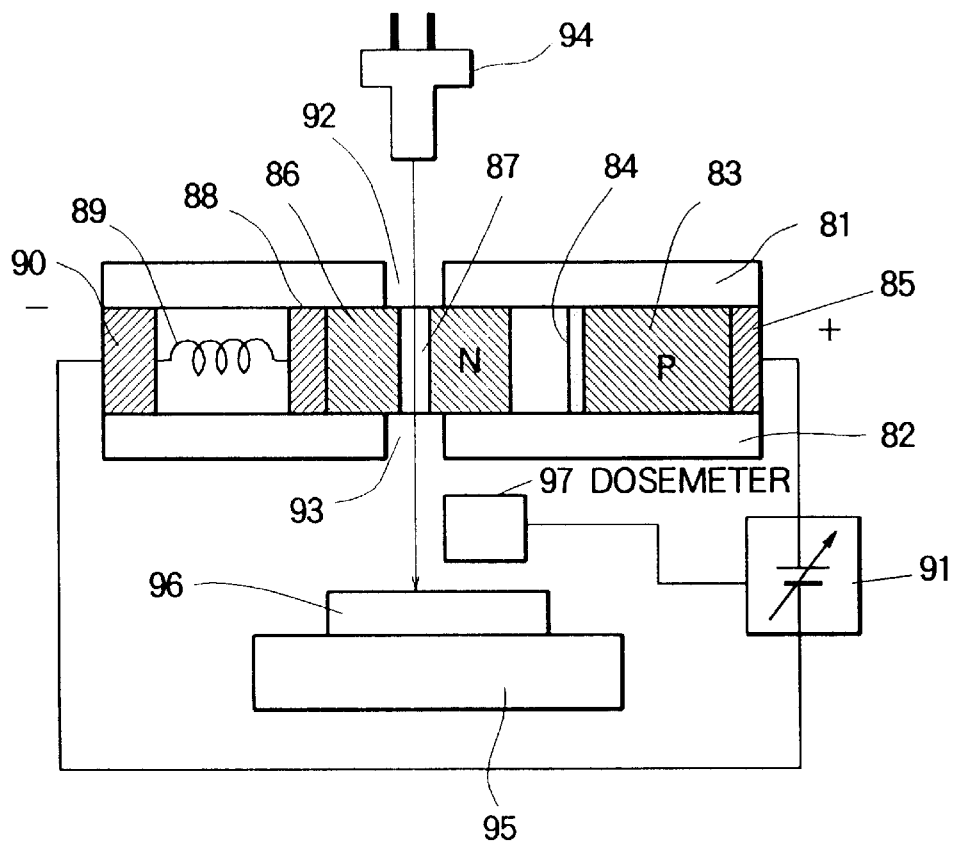
FIGS. 12A and 12B are a sectional diagram showing another embodiment of a monostable actuator according to the invention, which is utilized to constitute a shutter.
Figure 12B:
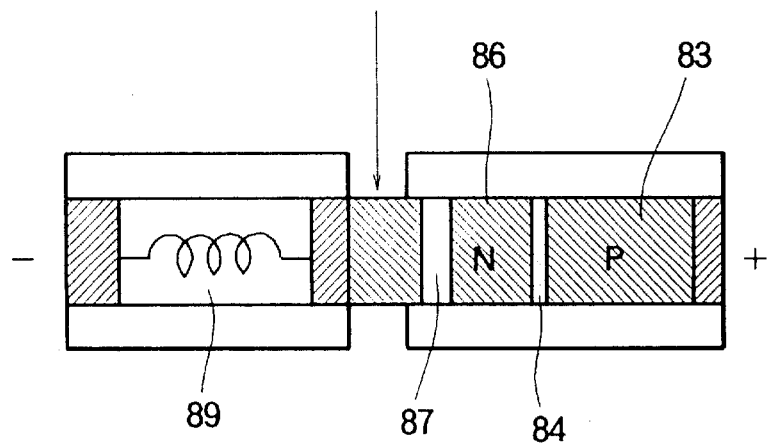

Referring to FIGS. 12A and 12B, a monostable actuator is constructed according to the invention, and is utilized as a shutter. A stationary member 83 is sandwiched between a pair of parallel plates 81, 82. The stationary member 83 is composed of a P type impurity semiconductor. One end face thereof is covered by an insulating film 84, and another end face thereof is formed with an electrode 85 in ohmic contact manner. A movable member 86 is slidably disposed between the parallel plates 81, 82 to constitute a shutter piece. The movable member 86 is composed of an N type impurity semiconductor, and is formed centrally with an orifice 87. One end face of the movable member 86 is opposed to the stationary member 83, and another end is formed with an electrode 88 in ohmic contact manner. The electrode 88 is coupled to a stationary metal piece 90 through a conductive spring 89. A variable voltage source 91 has a positive terminal connected to the electrode 85 of the stationary member 83, and a negative terminal connected to the other electrode 88 of the movable member 86 through the stationary metal piece 90 and the conductive spring 89.

The pair of parallel plates 81, 82 are formed centrally with respective openings 92, 93 which align with the vertical orifice 87. A given energy beam source 94 is disposed in alignment with a vertical axis which passes those of openings 92, 93 and orifice 87. The energy beam source 94 may be composed of a laser source, an ion beam gun or an electron beam gun. A workpiece 96 is mounted on a table 95 in an opposite site to the energy beam source 94 with respect to the parallel plates 81, 82. The energy beam source 94 emits an energy beam along the vertical axis to irradiate the workpiece 96 to effect certain processing or working. A dosemeter 97 is disposed around the vertical axis to continuously monitor a dose of the irradiated energy beam. The variable voltage source 91 increases its output voltage according to the output of the dosemeter 97.

In operation of the monostable actuator, as shown in FIG. 12A, the movable member 86 is held in a given monostable or home state by means of the bias spring 89. In this state, the energy beam source 94 is activated to carry out processing or working of the workpiece 96. During the operation, the dosemeter 97 continuously monitors the dose so that the output voltage of the variable voltage source 91 gradually rises.

As shown in FIG. 12B, when the monitored dose exceeds a predetermined amount, the output of the voltage source 91 exceeds the threshold level so that the shutter piece, i.e., the movable member 86 is attracted by the stationary member 83. Namely, the external electric field exceeds the threshold level, so that a strong electrostatic attractive force is generated across the insulating film 84 between localized electrons contained in the N type impurity semiconductor of the movable member 86, and localized holes contained in the P type impurity semiconductor of the stationary member 83. In this state, the orifice 87 formed in the shutter piece is dislocated from the vertical axis so that the energy beam is automatically blocked. Consequently, when the dose reaches the predetermined amount, the shutter is automatically closed to thereby stop the working. Thereafter, the applied voltage is removed so that the movable member 86 returns to the home position by biasing function of the spring 89.

Figure 13A:
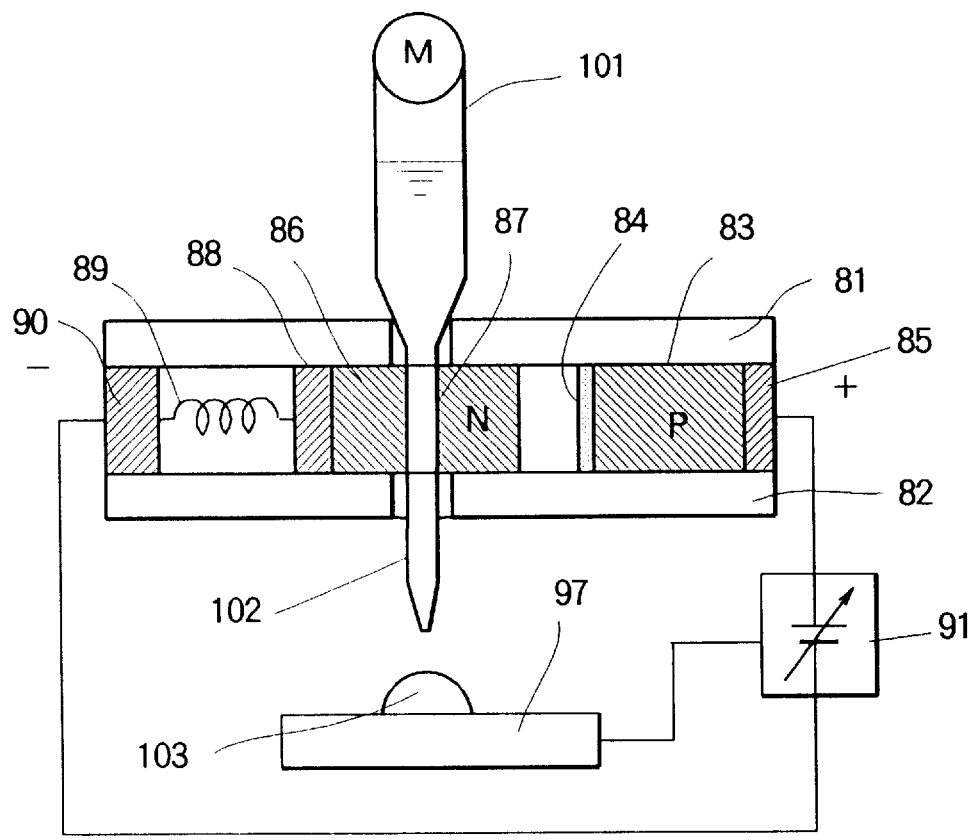
FIGS. 13A and 13B are a sectional diagram showing a microvalve composed of the inventive monostable actuator.
Figure 13B:
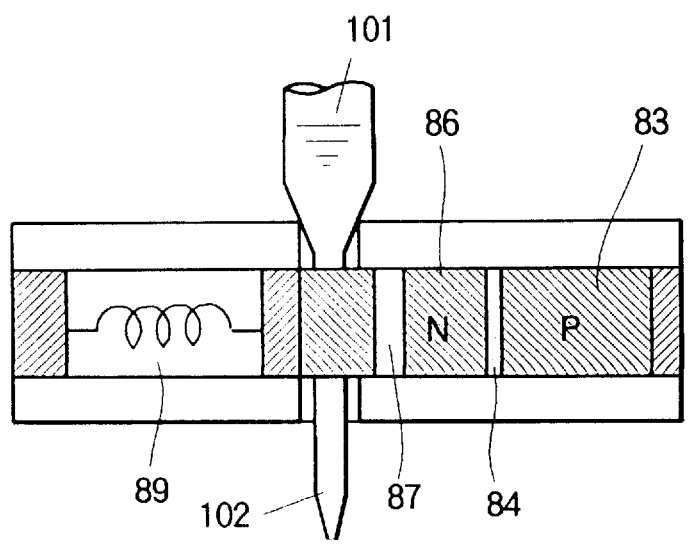

Referring to FIGS. 13A and 13B, the monostable actuator is utilized as a micro dispenser. In order to simplify the description of this embodiment, the same reference numeral denotes the same component as in the FIGS. 12A and 12B embodiment. A main part 101 of the micro dispenser is mounted on an upper plate 81, while a nozzle part 102 of the micro dispenser is attached to a lower plate 82. A movable member 86 is formed with an orifice 87 which communicates between both the parts of the micro dispenser.

As shown in FIG. 13A, the micro dispenser feeds a fluid 103 contained therein by means of a motor M in the state where the main part 101 and the nozzle part 102 are coupled to each other. The dropped fluid 103 is weighed by a gravimeter 97. The gravimeter 97 outputs a signal proportional to the dropped weight to a variable voltage source 91. Accordingly, an electrostatic field applied to the movable member 86 is gradually increased. As shown in FIG. 13B, when the dropped fluid reaches a predetermined volume, the intensity of the electrostatic field exceeds a certain threshold level so that the movable member 86 is attracted by the stationary member 83. Consequently, the nozzle part 102 is separated from the main part 101 of the micro dispenser so that the feeding of the fluid is instantly stopped. Thereafter, the electrostatic field is removed so that a valve piece composed of the movable member 86 returns to the initial position by means of a ring 89.

Figure 14:
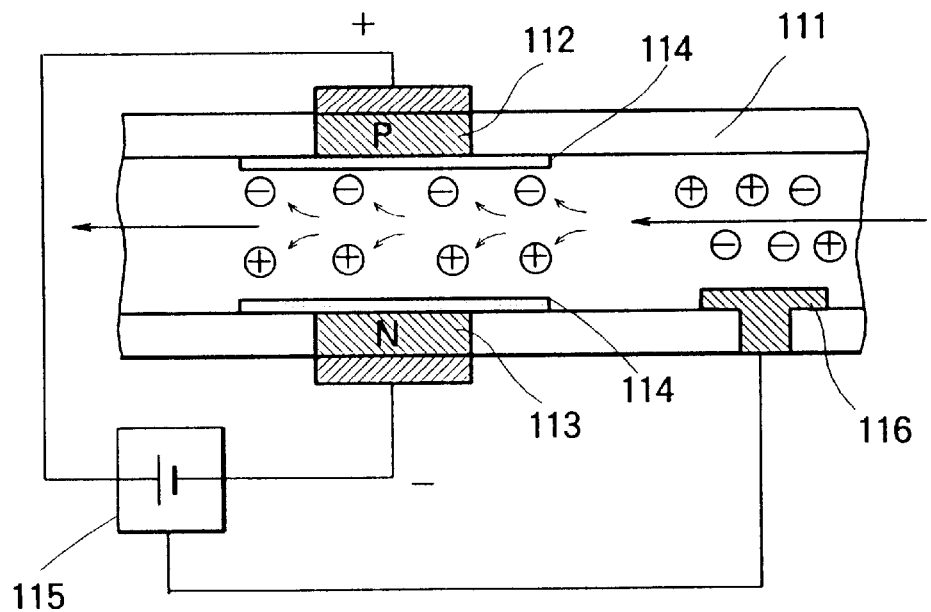
FIG. 14 is a schematic sectional diagram showing an ion trap device according to the invention.

In the above described bistable and monostable actuators, the electrostatic force generated by the semiconductor mechanical threshold effect is converted into a physical movement of the movable member. However, the inventive semiconductor active electrostatic device is not limited to such an actuator. For example, the electrostatic force may be utilized directly in another application of the invention. Referring to FIG. 14, an ion trap device is one embodiment which directly utilizes the electrostatic force. The ion trap device is provided with a conduit 111 for guiding a fluid containing ions. The conduit 111 is formed on its inner wall with an active electrode 112 composed of a P type impurity semiconductor, and a field electrode 113 composed of an N type impurity semiconductor. In actual operation, the active and field electrodes are exchangeable in this embodiment. Therefore, the field electrode will be referred to as a "counter electrode". An ion adsorptive film 114 is formed over the electrodes 112, 113. A constant voltage source 115 has a positive terminal connected to the active electrode 112, and a negative terminal connected to the counter electrode 113. An ion sensor 116 is disposed in an upstream of the conduit 111 for controlling the voltage source 115.

In operation, when the sensor 116 detects ions contained in the fluid flowing through the conduit 111, the constant voltage source 115 is turned on. Consequently, an electrostatic field exceeding a certain threshold level is applied between the pair of active electrode 112 and counter electrode 113 so that majority carriers contained in the respective semiconductor electrodes are localized toward the inner wall surface of the conduit 111. Consequently, a quite strong electrostatic force is induced transversely of the flowing fluid so that negative ions are adsorbed to the active electrode 112 of the positive polarity, while positive ions are adsorbed to the counter electrode 113 of the negative polarity. In contrast, conventionally, metal electrodes are utilized in place of the impurity semiconductor electrodes. However, the conventional device suffers frequently from discharge defect. To avoid the discharge defect, the metal electrode may be coated with a dielectric film. However, such a construction would adversely weaken an intensity of the generated electrostatic force. On the other hand, the inventive device can efficiently trap ions and has a relatively compact size, while avoiding discharge failure.

Figure 15:
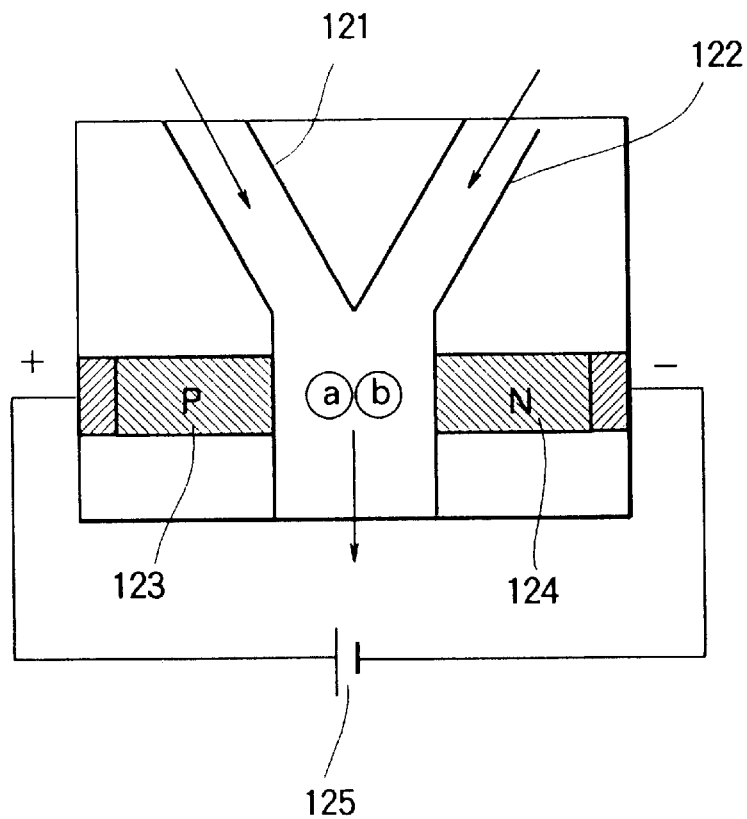
FIG. 15 is a schematic sectional diagram showing a cell fusion device according to the invention.

Referring to FIG. 15, a cell fusion device is disclosed as another application of the invention. In this device, one cell species a is introduced into one branch tube 121 and another cell species b is introduced into another branch tube 122. A pair of opposed electrodes 123, 124 are embedded in a confluence point of the pair of branch tubes 121, 122. The one electrode 123 is composed of a P type impurity semiconductor connected to a positive terminal of a constant voltage source 125. The other electrode 124 is composed of an N type impurity semiconductor connected to a negative terminal of the same voltage source 125. In such a structure, the P type impurity semiconductor contains a majority carrier of holes which are localized toward the confluence point, while the N type impurity semiconductor contains another majority carrier of electrons which are also localized toward the confluence point. A quite strong electrostatic force is induced between opposed high density layers of the respective localized majority carriers. The cell species a and b are fused to each other upon receipt of the induced electrostatic force at the confluence point. By such a manner, this embodiment is suitable for microprocess of cells.

Figure 16:
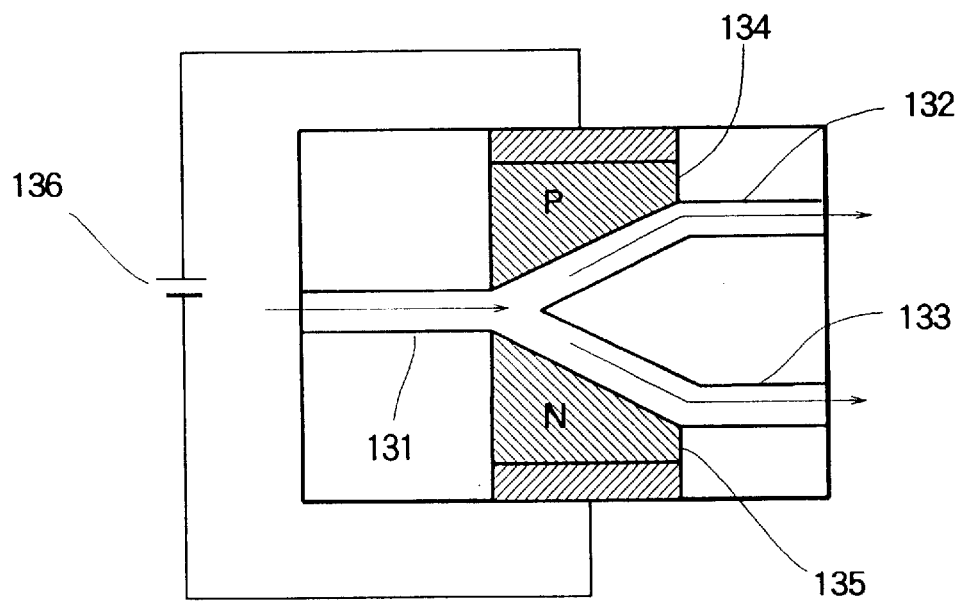
FIG. 16 is a schematic sectional diagram showing a cell separation device according to the invention.

Referring to FIG. 16, a cell separating device is disclosed as a further application of the invention. The device is provided with an inlet tube 131 which receives cells having positive or negative charge. The inlet tube 131 is divided into a pair of branches 132, 133 to connect to outlets. A pair of electrodes 134, 135 are buried in a branch point in opposed relation to each other. The one electrode 134 is composed of a P type impurity semiconductor connected to a positive terminal of a voltage source 136. The other electrode 135 is composed of an N type impurity semiconductor connected to a negative terminal of the same voltage source 136. A quite strong electrostatic force is generated between the pair of semiconductor electrodes 134, 135 according to the semiconductor mechanical threshold effect. Consequently, positively charged cells are deflected into the one branch 133, while negatively charged cells are deflected into the other branch 132. By such a manner, the cells can be separated according to their polarity of the charge.

Figure 17:
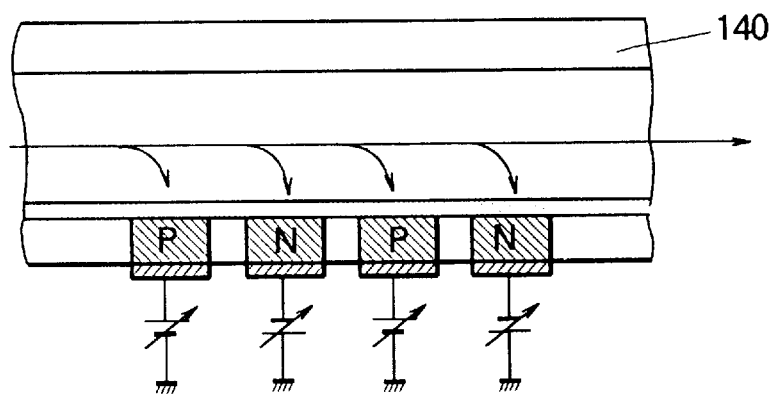
FIG. 17 is a schematic sectional diagram showing a cell alignment device according to the invention.

Referring to FIG. 17, a cell alignment device is constructed according to the invention. This device has a guide tube 140 which receives a fluid sample containing mixture of cell species having different masses and charges. P type and N type impurity semiconductor regions are buried at a given pitch along a flowing direction of the fluid sample in an inner wall of the guide tube 140. Each of the impurity semiconductor regions receives a given voltage of a given polarity. The cell species flowing through the guide tube 140 are collected by corresponding impurity semiconductor regions according to their masses and charges to thereby effect alignment of the cells.

Figure 18:
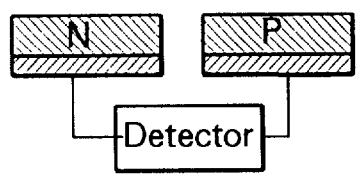
FIG. 18 is a schematic diagram showing an electric field sensing device according to the invention.

Referring to FIG. 18, an electric field detector is disclosed as an additional application of the invention. The detector has a pair of electrodes having formed thereon N type and P type impurity semiconductor regions, respectively. When an external electrostatic field is applied to these semiconductor regions, majority carriers are localized at a moment that the external electrostatic field exceeds a certain threshold level. Consequently, the detector can detect a potential difference caused between the pair of electrodes.

As described above, according to the invention, by controlling an external electrostatic field applied to an impurity semiconductor region, majority carriers are localized within the semiconductor region when the electrostatic field exceeds a certain threshold level to thereby generate an electrostatic force. The generated electrostatic force can be converted into a mechanical displacement to constitute an actuator. Such a construction of the actuator has a binary judgement function or threshold function for the input electrostatic field according to the semiconductor mechanical threshold effect, in contrast to a conventional actuator. Therefore, the inventive actuator can advantageously perform more intelligent operation as compared to the conventional primitive actuator.

Figure 19:
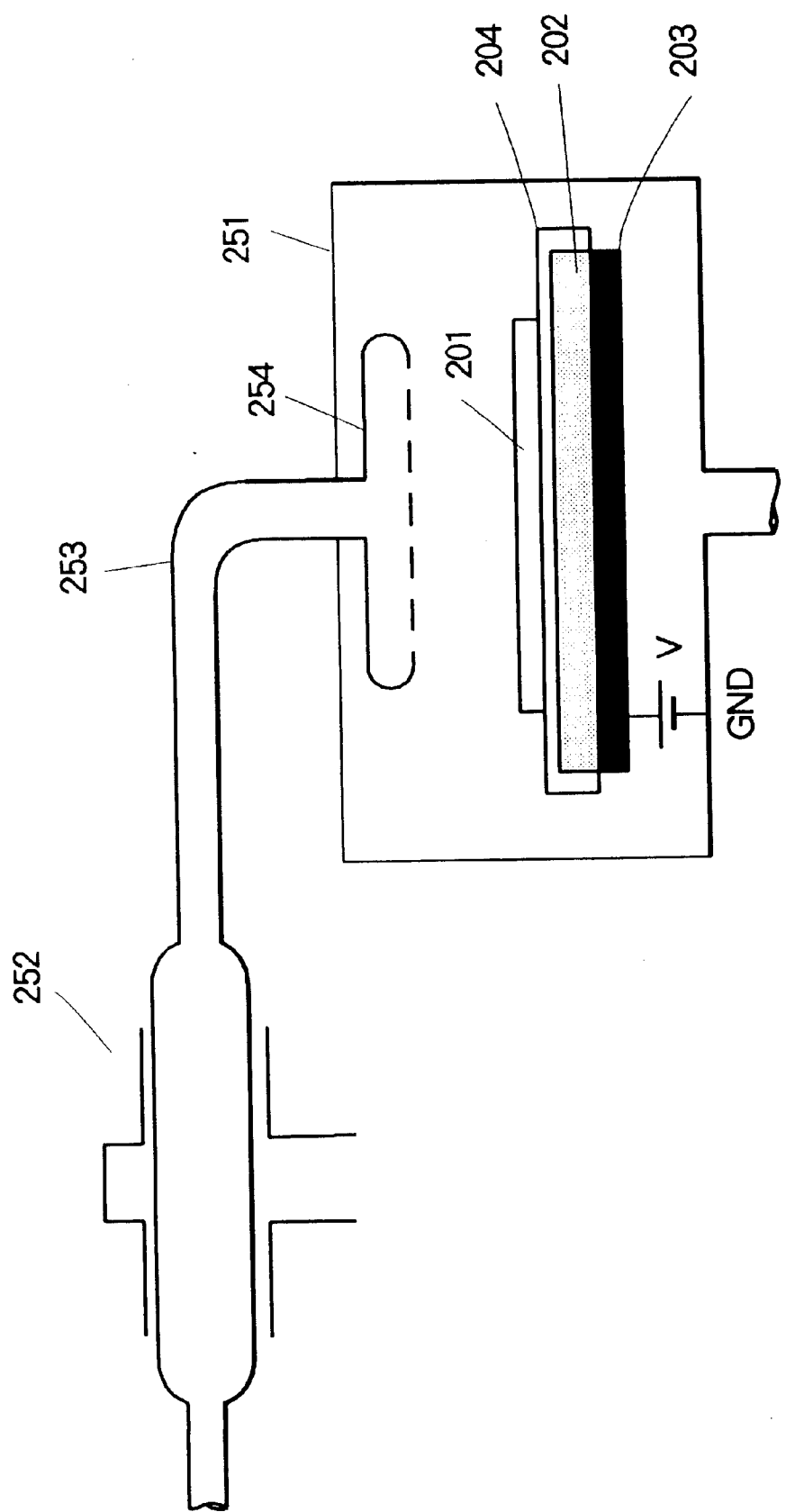
FIG. 19 is a schematic diagram showing a semiconductor holding device according to the invention.

Referring to FIG. 19, a wafer holding device is constructed according to the invention. A semiconductor is generally utilized as a functional material of various electronic components and elements. Particularly, a semiconductor ingot of silicon is sliced into wafers which are used for producing integrated circuit devices. In the LSI fabrication, a silicon wafer is loaded into various reaction chambers to carry out processing. The wafer is held in a horizontal or vertical attitude while optionally rotated if desired, in the reaction chamber. The wafer must be supported and fixed firmly in place so as to ensure precise fine processing. The inventive wafer holding device or susceptor is constructed for this purpose. In this embodiment, the wafer holding device is disposed within a chemical dry etching apparatus. Alternatively, the inventive holding device can be mounted into other semiconductor processing apparatuses such as a barrel plasma etching machine, a planar plasma etching machine, a reactive ion etching machine, a reactive ion beam etching machine, an exposure machine and a stepper machine. As shown in the figure, a planar impurity semiconductor 202 is fixed on a stage 203 composed of a conductive material such as metal. A protective film 204 covers an entire surface of the impurity semiconductor 202. However, the protective film 204 is not an indispensable component, but may be eliminated occasionally. A silicon wafer 201 is loaded as a workpiece on the stage 203 through the impurity semiconductor 202.

Such a construction of the wafer holding device is disposed within a vacuum chamber 251 of the chemical dry etching machine. A plasma generating chamber 252 is provided separately from the vacuum etching chamber 251. These chambers 251, 252 are connected to each other by a conduit 253. The conduit 253 is equipped at its end with a nozzle 254 which is placed within the etching chamber 251. A plasma generated in the separate chamber 252 is transferred through the conduit 253 to irradiate a surface of the silicon wafer 201 by means of the nozzle 254 to thereby effect chemical dry etching.

The metal stage 203 constitutes field means for applying an electrostatic field to the active impurity semiconductor 202. Namely, a given control voltage is applied between the stage 203 and a housing of the etching chamber 251. Generally, the housing of the chamber 251 is connected to a ground level GND. As seen from the figure, the silicon wafer 201 is electrically floated from the metal stage 203, and is therefore not affected by electrostatic damage.

Figure 20:
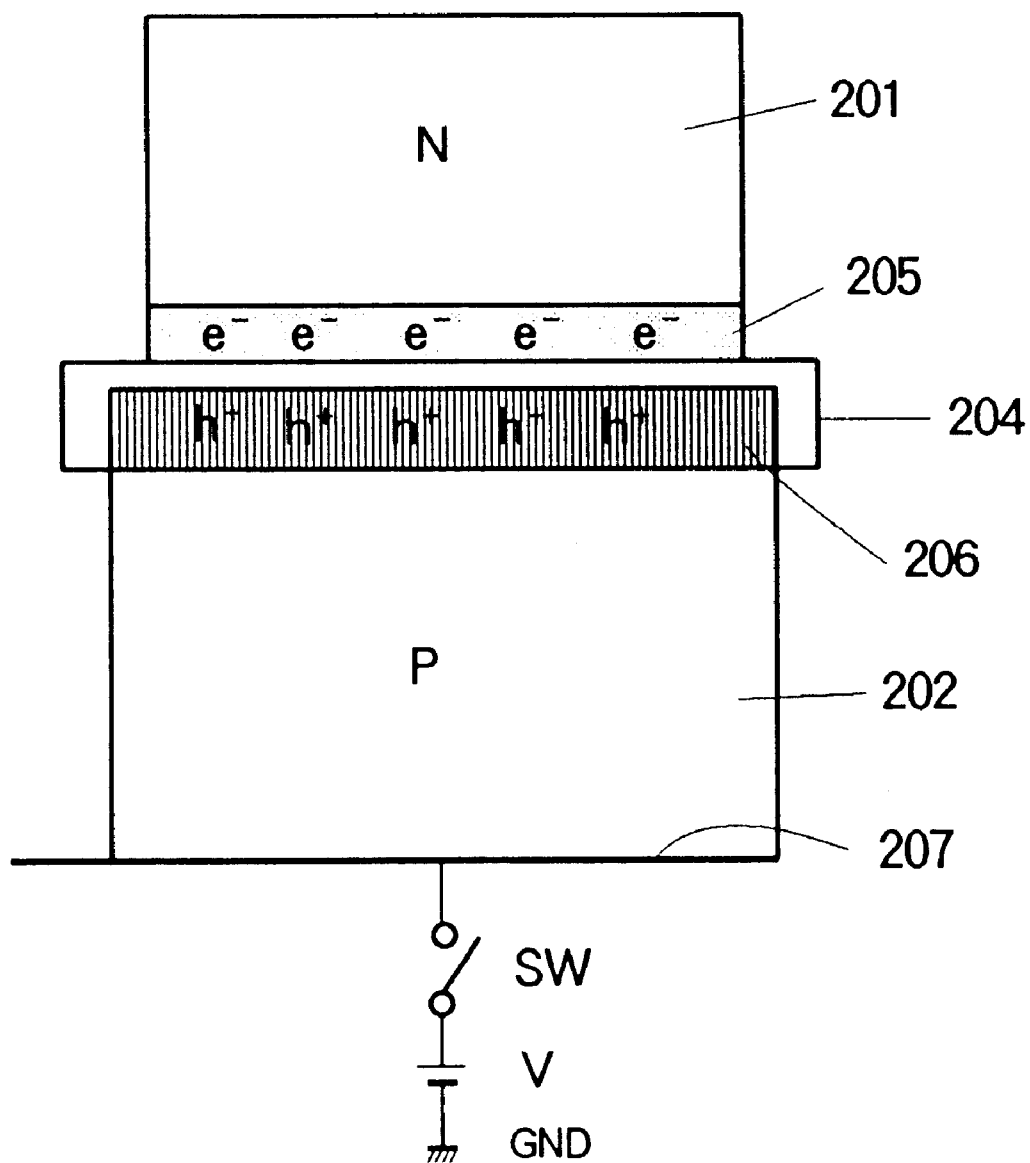
FIG. 20 is an illustrative diagram explanating the operation of the FIG. 19 device.

Referring to FIG. 20, in operation of the FIG. 19 device, the silicon wafer 201 of N type is attracted by the impurity semiconductor 202 of P type. An electrode film 207 is formed on a bottom face of the active impurity semiconductor 202 for good electrical contact to the metal stage (not shown). The electrode film 207 is formed by plasma ion evaporation or ion plating to ensure ohmic contact to the active semiconductor 202. Further, a switch SW is interposed between the voltage source V and the metal stage for controlling the applied electrostatic field to release attraction of the wafer. When the switch SW is turned on, the voltage V of the positive polarity exceeding a certain threshold level is applied to the bottom face of the active semiconductor 202 relative to the ground level GND. Under such an electrostatic field exceeding the threshold level, majority carriers of holes move away from the electrode film 207 of the positive polarity, within the P type impurity active semiconductor 202 to thereby form a high density layer 206 of the holes h+. Additionally, acceptor impurity doped into a bulk portion of the impurity semiconductor 202 is ionized negatively. On the other hand, majority carriers comprised of electrons e$^-$ are attracted by the generated electrostatic force to form a high density layer 205 of the electrons e$^-$ of the opposite polarity within the N type silicon wafer 201 along a rear face thereof. Consequently, a strong attractive force is induced between both of the hole and electron high density layers 206, 205 so that the silicon wafer 201 is firmly fixed to the stage.

Figure 21:
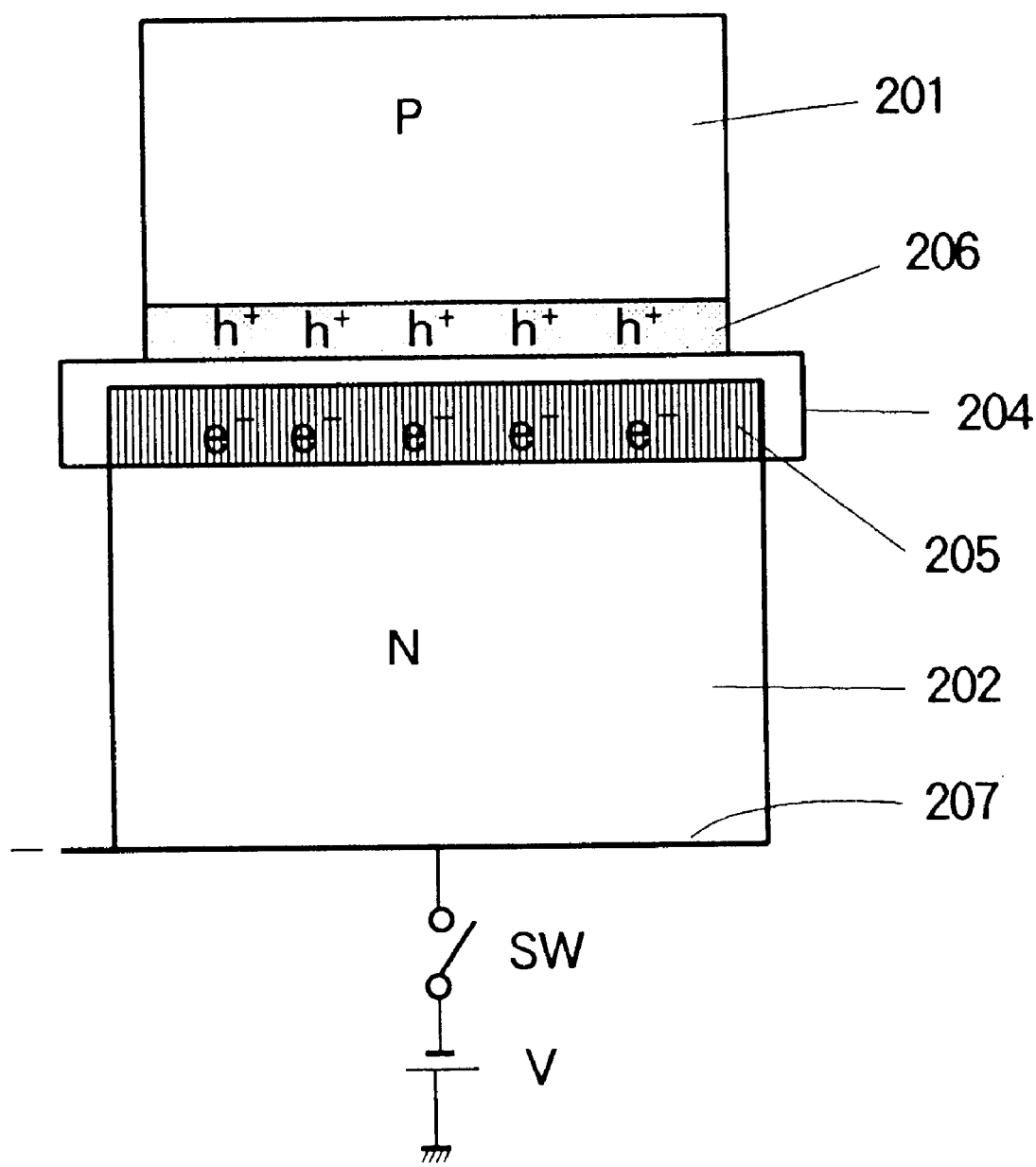
FIG. 21 is another illustrative diagram explanating the operation of the FIG. 19 device.

Referring to FIG. 21, in another operation of the FIG. 19 device, a P type of the silicon wafer 201 is attracted by an N type of the impurity active semiconductor 202. In manner similar to the FIG. 20 case, an attractive force by the localized charges is induced between the active semiconductor 202 and the silicon wafer 201, thereby effecting holding and fixing of the wafer 201. However, polarity relation is opposite to the FIG. 20 case. Namely, a negative polarity of the source voltage V is applied to the electrode film 207 relative to the ground level of a surrounding chamber housing. Under such an electrostatic field, the majority carrier comprised of the electrons e$^-$ receives a repulsive force by the electrode film 207 of the negative polarity, within the N type active semiconductor 202 to thereby move away to form a high density layer 205 of the electrons e– along a top surface of the active semiconductor 202. Additionally, donor impurity diffused into the active semiconductor 202 is ionized positively in a bulk portion thereof. During a transient period of the voltage application, free electrons are injected into the bulk portion of the active semiconductor 202 to neutralize the donor impurity. On the other hand, the majority carrier comprised of holes h$^+$ within the P type silicon wafer 201 is attracted by a strong electrostatic force generated by the opposed high density layer 205 of the localized electrons e$^-$, to thereby form a high density layer 206 of holes h$^+$ along a rear face of the silicon wafer 201. Consequently, a quite strong attractive force is induced across the insulating film 204 between the opposed high density layers 205, 206 of opposite polarities.

The silicon wafer is fixed in horizontal attitude to the stage in this embodiment. However, the invention is not limited to this embodiment, but the semiconductor wafer can be held in vertical or declined attitude, if desired, by using a quite strong electrostatic attractive force. The holding device is designed to mount and fix a silicon wafer; however, the inventive holding device may be modified for other uses. For example, the holding mechanism utilizing the semiconductor mechanical threshold effect can be incorporated into a wafer transfer device. The loading and unloading of the wafer can be controlled by an electrical switch, which is quite suitable for a load lock mechanism. Particularly in contrast to a conventional holding device which is operated based on dielectric polarization, the inventive holding device is not required to apply a direct voltage to the semiconductor wafer, thereby simplifying electrical contact construction thereof. Additionally, the semiconductor wafer is placed in a floating potential level in the above described embodiment; however, the invention is not limited to such an embodiment. In other cases, a given bias voltage may be applied to fix a potential level of the semiconductor wafer. Further, according to the invention, the semiconductor wafer is firmly attracted by the significant electrostatic force under a great pressure which is effective to reduce a thermal resistance between the wafer and the stage containing a thermal source, during the course of thermal treatment of the wafer. Lastly, the inventive wafer holding device well works under any vacuum condition.

Figure 22:
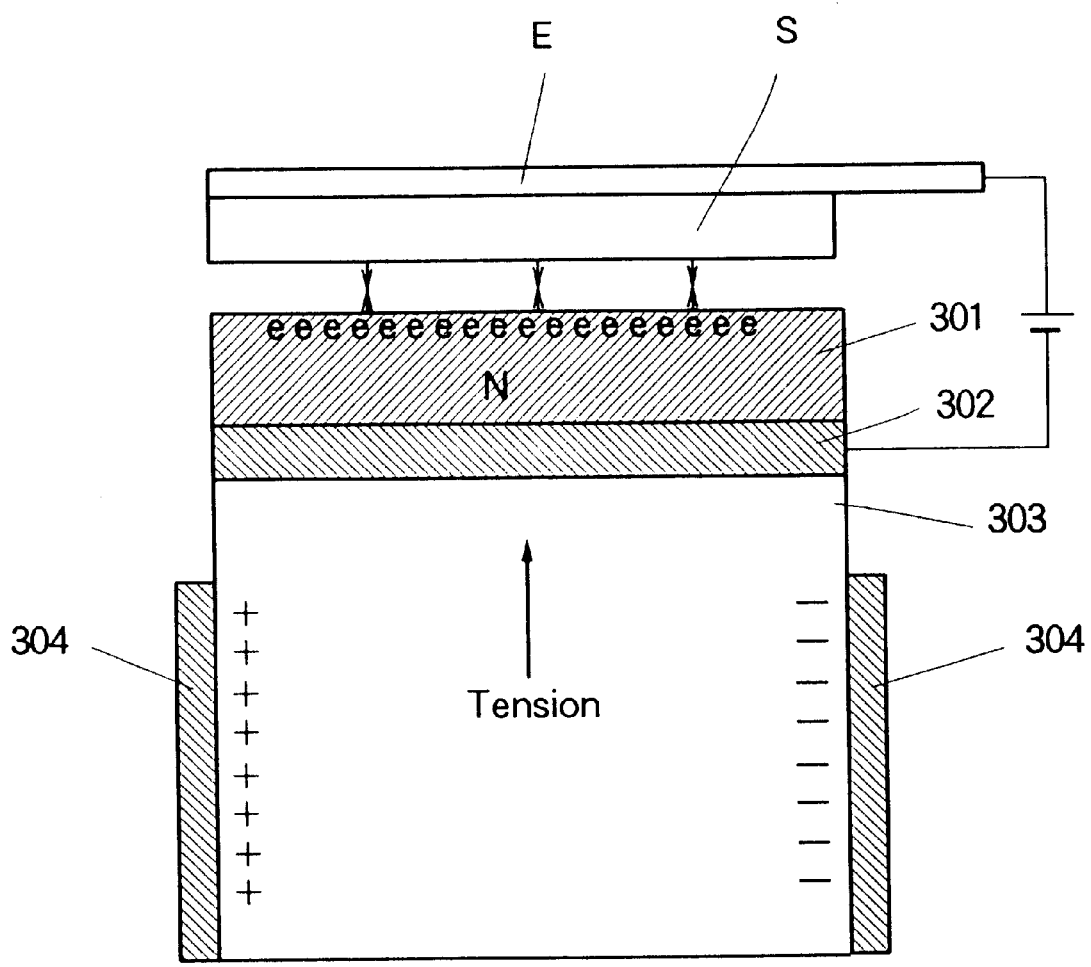
FIG. 22 is a schematic diagram showing a basic structure of a semiconductor detecting device according to the invention.

Referring to FIG. 22, a wafer composition detecting device is constructed according to the invention. The wafer composition detecting device is designed to discriminate composition of semiconductor material such as silicon wafer. The semiconductor material is utilized for various electronic components or elements. For example, a silicon ingot is sliced to form a silicon wafer which is used for producing an integrated circuit device. Intrinsic and impurity silicon wafers are adopted selectively for various types of electronic components. The impurity semiconductor is formed by doping donor or acceptor into the intrinsic semiconductor. The N type semiconductor contains majority carrier composed of electrons, while the P type semiconductor contains another majority carrier composed of holes. Besides such a difference of the conductivity types, a desired electrical conductivity is obtained by adjusting an impurity density of the diffused donor or acceptor. The silicon wafer has a desired conductivity type and a desired electrical conductivity according to use of purpose and required electrical characteristics. However, the silicon wafer has a common dull metallic appearance regardless of the conductivity type and the electrical conductivity. Therefore, it is impossible to discriminate visually an individual wafer. In view of this, the wafer composition detecting device is needed to discriminate wrong ones among the mixture of wafers prior to the processing. As shown in FIG. 22, the device is comprised of an active impurity semiconductor 301 which is attached to a piezoelectric element 303 through a field electrode 302. A pair of electrodes 304 are formed on opposite sides of the piezoelectric element 303. In order to discriminate a wafer composition, a test wafer S is positioned in spaced relation to a top face of the active semiconductor 301. Provisionally, an electrode plate E is pressed to a rear or upper face of the test wafer S as a weight. In view of this, the electrode plate E is preferably composed of a planar metal having a certain weight.

In operation of the FIG. 22 device, a given voltage is applied between the field electrode 302 and the electrode plate E in order to drive the wafer composition detecting device. The applied voltage is set adequately such that an electrostatic field around the active semiconductor 301 exceeds a certain threshold level so that electrons are localized on a top surface of the active semiconductor 301 of N type. Consequently, the localized electrons act to the test wafer S to generate an attractive force therebetween. Accordingly, a significant tension force is induced within the piezoelectric element 303 to produce an output voltage across the pair of side electrodes 304 in response to the tension force according to the lateral piezoelectric effect.

The magnitude of the generated electrostatic attractive force depends on a conductivity type of the test wafer. For example, the test wafer S is of the P type, the efficient electrostatic force is induced between its majority carrier of holes and the localized electrons so that the internal tension of the piezoelectric element 303 is relatively great. In proportion to the great tension, a relatively great output voltage develops across the pair of side electrodes 304. Further, the higher the impurity density of the test wafer S, the greater the output voltage. On the other hand that the test wafer S is of the N type, the electrostatic force acts to form an inversion or depletion layer in a lower surface of the test or sample wafer S. Accordingly, the opposed pair of N type sample wafer S and the N type active semiconductor 301 produce an attractive force which is smaller than that produced between the P type sample wafer S and the N type active semiconductor 301. Consequently, the output voltage of the piezoelectric element 303 becomes smaller. In such a manner, by monitoring the output voltage, the detecting device can discriminate the conductivity type and the electrical conductivity of the sample wafer S.

Figure 23:
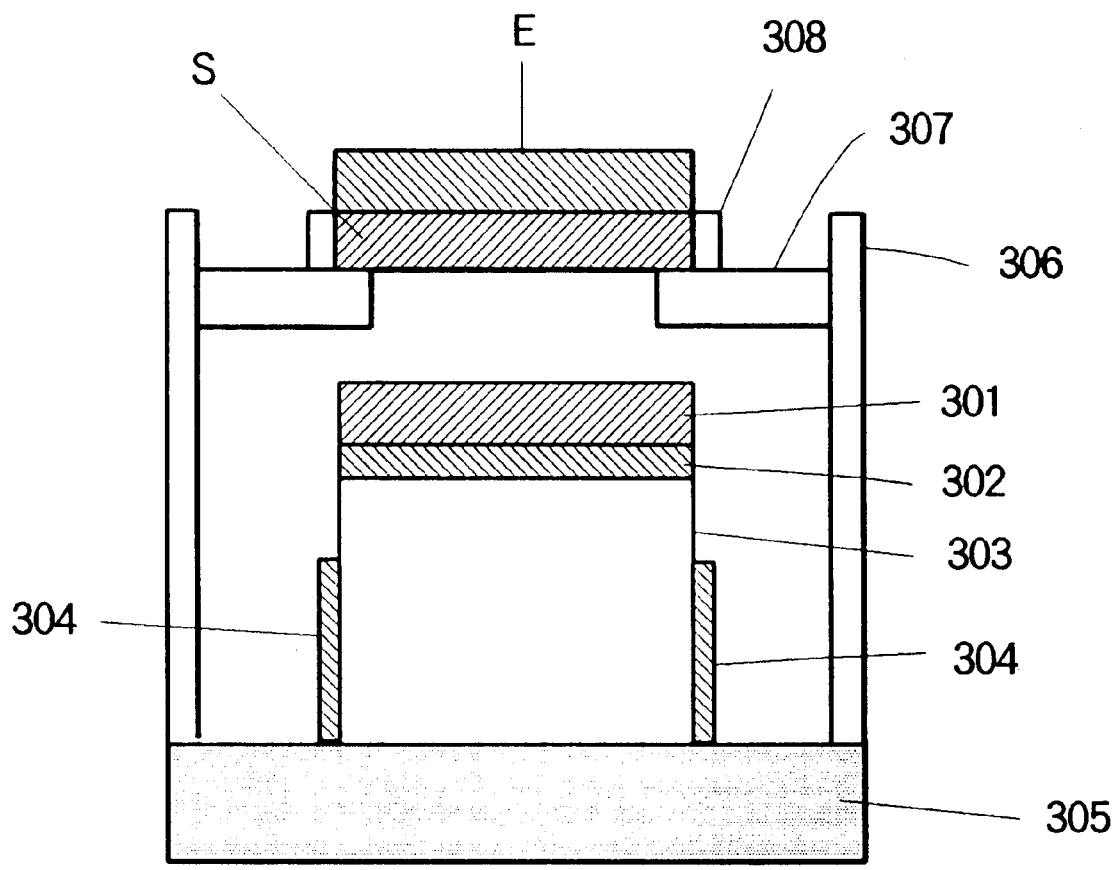
FIG. 23 is a schematic sectional diagram showing an embodiment of the inventive semiconductor detecting device.

Referring to FIG. 23, a practical embodiment of the wafer composition detecting device utilizes a piece of an impurity semiconductor 301 as a sensitive and active element. The impurity semiconductor 301 may be either of N and P types. However, in order to obtain an efficient density of the majority carrier, the impurity density of the donor or acceptor is optimumly set in the range of $10^{15}$ atom/cm$^3$ through $10^{21}$ atom/cm$^3$. A field or base electrode 302 is formed on a rear face of the active semiconductor 301. The base electrode 302 is formed integrally by plasma ion evaporation or ion plating to ensure facial ohmic contact.

A piezoelectric element 303 is disposed under the active semiconductor 301. The piezoelectric element 303 is composed of quartz or barium titanate shaped in a solid form. The piezoelectric element 303 is fixed to the base electrode 302 by means of a hard or rigid adhesive effective to transmit an external force from the active semiconductor 301 to the piezoelectric element 303. A pair of output electrodes 304 are formed on opposed sides of the piezoelectric element 303. These electrodes 304 are formed of metal by plasma ion evaporation or ion plating to ensure ohmic contact to the piezoelectric element 303. The pair of output electrodes 304 are arranged orthogonally to the base electrode 302. The piezoelectric element 303 is electrified by a mechanical stress caused by an external strain applied orthogonally to the base electrode 302. In this piezoelectric element, the electrification direction is orthogonal to the external force direction to cause the lateral piezoelectric effect. Namely, piezoelectricity of this effect is detected in terms of a voltage across the pair of output electrodes in proportion to the external force. The inventive device is composed integrally of these active semiconductor 301, base electrode 302 and piezoelectric element 303.

Such a detector unit is mounted on a substrate 305 which may be composed of insulative material such as glass and quartz. A cylinder piece 306 is disposed on the substrate 305 to surround the central detector unit. The cylinder piece 306 is also composed of glass or quartz having a relatively small thermal expansion rate. A support disc 307 is fixed to an open end of the cylinder member 306. The support disc 307 is formed centrally with a window. A guide 308 is attached to the disc 307 to surround the window. This guide 308 is adhered to the surface of the support disc 307. Alternatively, the guide may be formed integrally with the disc 307.

A sample wafer S is mounted within the guide 308 for the measurement. An electrode plate E is pressed onto a rear face of the sample wafer S. The electrode plate E is composed of gold, and is polished to ensure a flatness comparable to the sample wafer S. The electrode plate E is pressed onto the sample wafer S by means of an electroconductive adhesive with a weight of about 100 g. The thus prepared sample wafer is set into the guide 308. The lower face of the sample wafer S is opposed to the upper face of the active semiconductor 301 within the window through a given gap or spacing.

Figure 24:
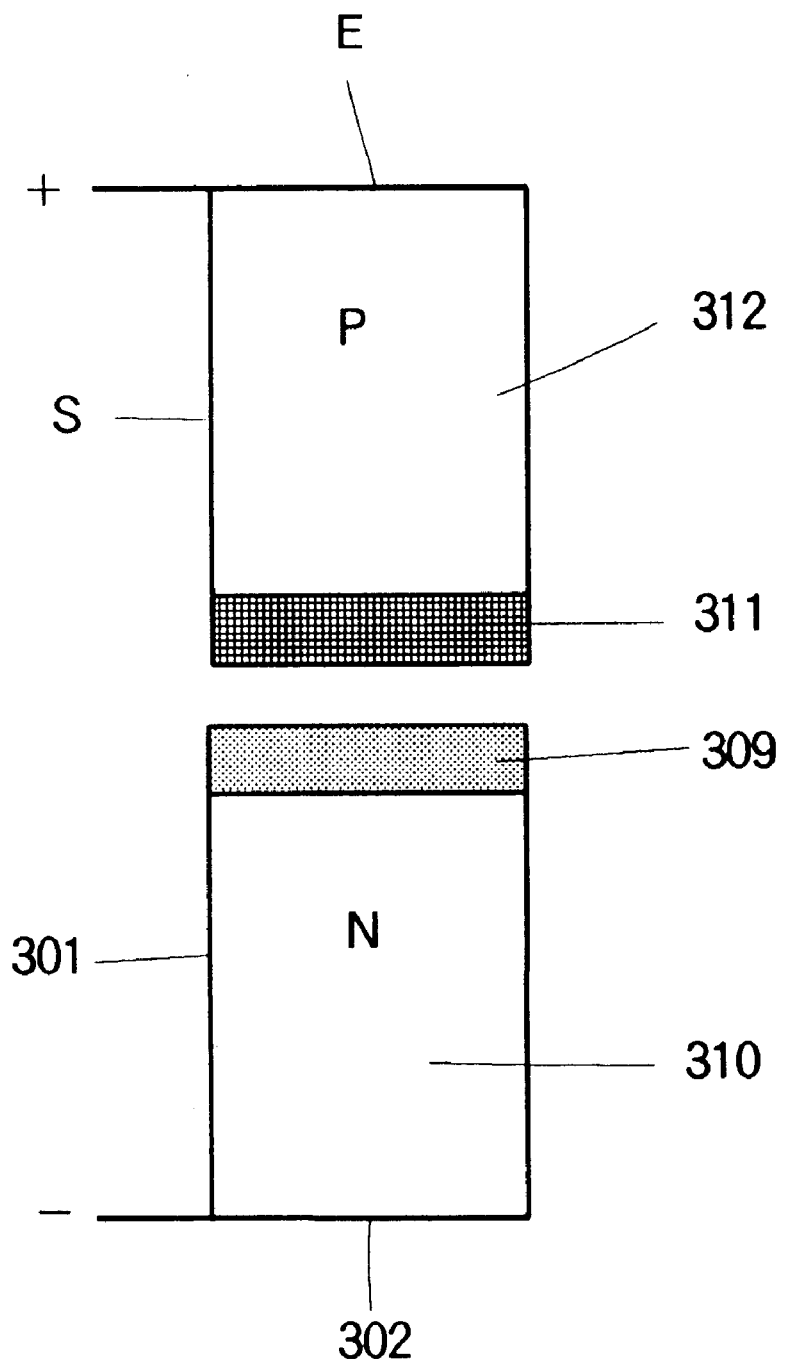
FIG. 24 is an illustrative diagram showing the operation of the FIG. 23 device.
Figure 25:
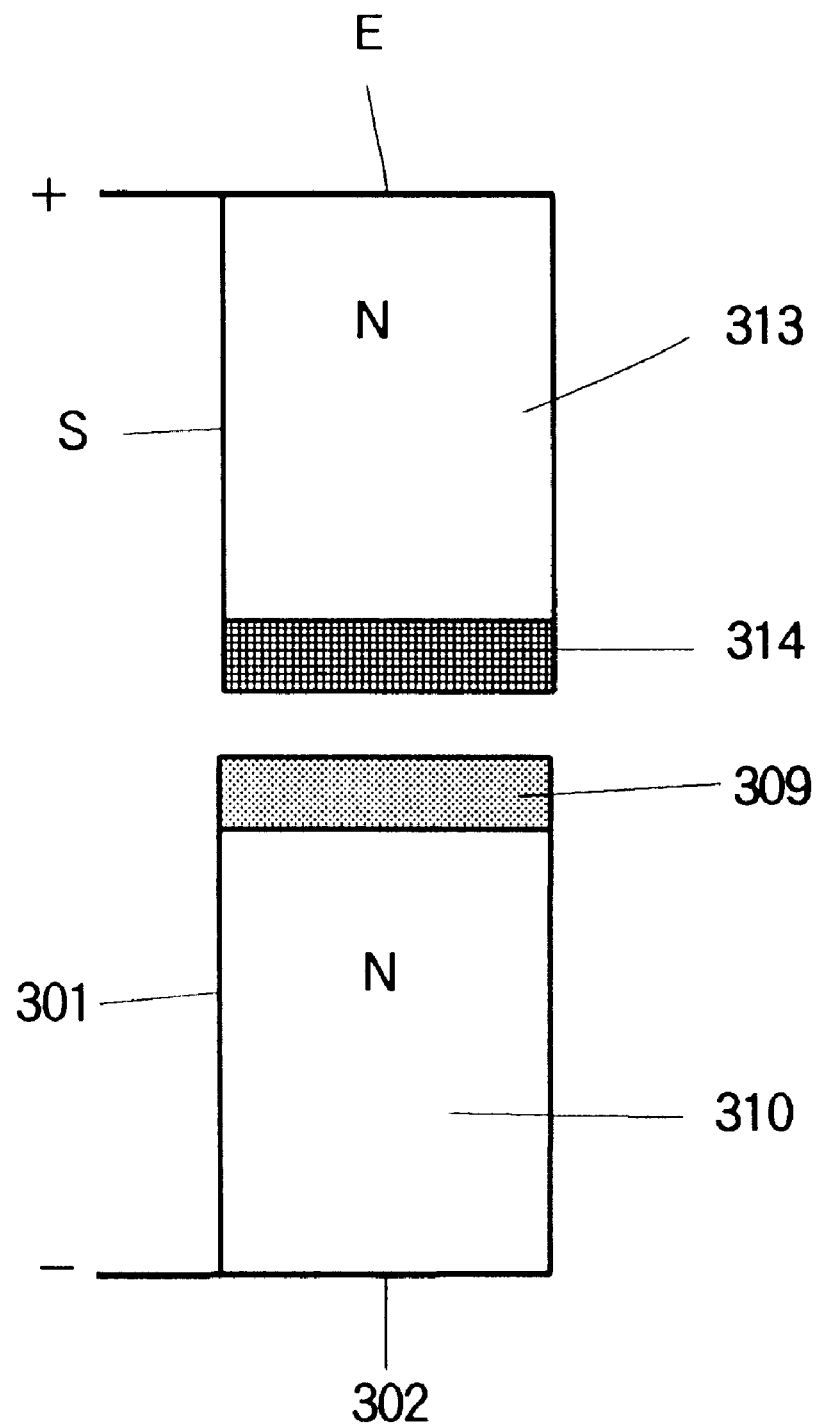
FIG. 25 is another illustrative diagram showing the operation of the FIG. 23 device.

Referring to FIGS. 24 and 25, the FIG. 23 device utilizes an N type of the active impurity semiconductor 301. Alternatively, a P type of the active semiconductor may be adopted. As shown in FIG. 24, a P type of the sample wafer is set on the device. In order to operate the device, a negative polarity potential is applied to the base electrode 302, while a positive polarity potential is applied to the electrode plate E of the sample wafer. Under such an electrostatic field exceeding a given threshold level, the majority carrier of electrons is moved away from the base electrode 302 of the negative polarity within the N type active semiconductor 301 to form a high density layer 309 of the localized electrons. Additionally, donor impurity diffused in a bulk portion of the active semiconductor is ionized positively. However, the positive ions are neutralized by free electrons injected from the base electrode 302 during a transient period of the voltage application, thereby lastly forming a neutral region 310 in a stable state.

On the other hand, the majority carrier comprised of holes are moved away from the electrode plate E of the positive polarity within the sample wafer S to thereby form a high density layer 311 of localized holes in the lower surface of the sample wafer S. At this stage, a bulk portion of the sample wafer S forms a layer 312 of ionized impurities.

A significant electrostatic attractive force is induced between the localized electrons contained in the upper surface of the impurity semiconductor 301 and the other localized holes contained in the lower surface of the sample wafer S. The attractive force is transmitted to the piezoelectric element to be detected by the pair of output electrodes in terms of an electric signal. The actually produced output electrostatic force is far greater than a theoretical value calculated according to Coulomb's law, thereby outputting an intense electric signal. Stated otherwise, the inventive detecting device has a high sensitivity. Further, the attractive force depends on hole density of the high density layer 311 formed in the surface of the sample wafer S. Stated otherwise, the output voltage varies according to the impurity density of the sample wafer S. Thus, the electric conductivity of the sample wafer can be measured, as well as the conductivity type can be discriminated by analyzing the output voltage.

Referring to FIG. 25, an N type of the sample wafer S is mounted on the detector unit. During a transient period of the voltage application, the majority carrier of electrons flows out of the bulk portion of the sample wafer S, thereby forming a layer 313 containing positively ionized donor impurity. Further, an inversion layer or depletion layer 314 is formed along the lower surface of the sample wafer S. On the other hand, the high density layer 309 of the localized electrons is formed along the upper surface of the active semiconductor 301 in manner similar to the FIG. 24 case. A moderate attractive force is induced between the inversion layer 314 and the high density layer 309 of electrons. This moderate attractive force is smaller than that induced between the high electron density layer 309 and the high hole density layer 311 of the FIG. 24 case. Consequently, the piezoelectric element produces at its output electrode pair a moderate signal smaller than that of the FIG. 24 case. The conductivity type of the sample wafer S can be discriminated by analyzing the output signal. Even such a moderate attractive force induced between the high electron density layer 309 and the inversion layer 314 is still greater than the theoretical value expected by Coulomb's law. This is specific to the behavior of the majority carrier being localized in the surface of the impurity semiconductor in accordance with the past invention.

What is claimed is:

1. A semiconductor active electrostatic device comprising: active means for generating an output electrostatic force in response to an applied electrostatic field, the output electrostatic force having a transition point at a predetermined threshold level of the applied electrostatic field, the active means having a semiconductor region containing carriers movable in response to the applied electrostatic field, the carriers being sufficiently localized within the semiconductor region when the applied electrostatic field exceeds the predetermined threshold level to thereby increase the output electrostatic force more sharply than when the applied electrostatic field is below the predetermined threshold level; field means for generating an electrostatic field and applying the electrostatic field to the semiconductor region of the active means; and control means for controlling the strength of the electrostatic field to selectively exceed the predetermined threshold level so as to localize the carriers within the semiconductor region to thereby generate an output electrostatic force.

2. A semiconductor active electrostatic device according to claim 1; wherein the field means has an electrode for inducing an electrostatic field, and the control means comprises means for supplying a variable voltage level to the electrode so as to electrically control the strength of the electrostatic field.

3. A semiconductor active electrostatic device according to claim 1; wherein the control means comprises means for variably regulating a distance between the active means and the field means so as to physically control the strength of the electrostatic field.

4. A semiconductor active electrostatic device according to claim 1; wherein at least one of the active means and the field means is relatively movable with respect to the other and the active means and the field means comprise a pair of movable and stationary members operative to convert the generated output electrostatic force into a mechanical displacement of the movable member.

5. A semiconductor active electrostatic device according to claim 4; wherein the movable member is configured as a switch contact for use in an electrical switch.

6. A semiconductor active electrostatic device according to claim 4; wherein the movable member is configured as a shutter for use in an optical device.

7. A semiconductor active electrostatic device according to claim 4; wherein the movable member is configured as a valve.

8. A semiconductor active electrostatic device according to claim 1; wherein the active means comprises a doped semiconductor material having an impurity density in the range of $10^{15}$ atom/cm$^3$ to $10^{21}$ atom/cm$^3$.

9. A semiconductor active electrostatic device according to claim 8; wherein the field means comprises a doped semiconductor material having an impurity density in the range of $10^{15}$ atom/cm$^3$ to $10^{21}$ atom/cm$^3$.

10. A semiconductor active electrostatic device according to claim 1; wherein the control means includes means for controlling the strength of the applied electrostatic field so as to produce an output electrostatic force inversely proportional to a value greater than the squared value of a gap distance between an opposed pair comprised of the active means and the field means.

11. A semiconductor active electrostatic device according to claim 1; wherein the active means comprises a semiconductor member having a top face receptive of a workpiece and a bottom face, the field means comprises a field electrode disposed below the bottom face of the semiconductor member, and the control means comprises means for selectively supplying a drive voltage to the field electrode to localize the carriers along the top face of the semiconductor member to generate an output electrostatic force effective to attract and fix a workpiece.

12. A semiconductor active electrostatic device according to claim 1; further comprising means for positioning a testpiece comprising a doped semiconductor material in opposed relation to the active means, and means for detecting an interactive electrostatic force induced between the testpiece and the active means so as to discriminate a conductivity type of the doped semiconductor material.

13. A holding device for holding a workpiece, comprising: a semiconductor member having a first surface receptive of a workpiece and a second surface opposing the first surface, the semiconductor member containing carriers localizable along the first surface in response to an applied electrostatic field exceeding a predetermined threshold level; and drive means for applying to the second surface a drive voltage to induce in the semiconductor member an electrostatic field exceeding the predetermined threshold level, effective to localize the carriers along the first surface of the semiconductor member to produce an output electrostatic force effective to fix and hold the workpiece.

14. A semiconductor detecting device for discriminating the conductivity type of a testpiece, comprising: semiconductor active means containing carriers localizable in response to an applied electrostatic field exceeding a predetermined threshold level and operative to generate and output electrostatic force in response to the applied electrostatic field; drive means for applying to the semiconductor active means an electrostatic field exceeding the predetermined threshold level, effective to localize the carriers; means for positioning a testpiece of a given conductivity type in opposed relation to the semiconductor active means such that an interactive electrostatic force is induced therebetween by the localized carriers in accordance with the conductivity type of the testpiece; and sensing means for sensing the interactive electrostatic force to discriminate the conductivity type of the testpiece.

15. A semiconductor detecting device according to claim 14; wherein the sensing means comprises a piezoelectric element fixed to the semiconductor active means for converting the interactive electrostatic force transmitted therefrom into a corresponding electric signal indicative of the conductivity type of the testpiece.

16. A semiconductor active electrostatic device comprising: field means for producing an electrostatic field; and active means for generating an output electrostatic force in response to an applied electrostatic field, the output electrostatic force having a transition point at a predetermined threshold level of the applied electrostatic field, the active means being placed in the electrostatic field and having a semiconductor region containing carriers which are excited and localized when the electrostatic field exceeds the predetermined threshold level to thereby sharply increase the output electrostatic force as compared to when the applied electrostatic field is below the predetermined threshold level.

17. A semiconductor electrostatic device comprising: active means for generating an output electrostatic force in response to an applied electrostatic field, the output electrostatic force having a transition point at a predetermined threshold level of the applied electrostatic field, the active means having a semiconductor region containing carriers movable in response to the applied electrostatic field, the carriers being sufficiently localized within the semiconductor region when the applied electrostatic field exceeds the predetermined threshold level to thereby increase the output electrostatic force more sharply than when the applied electrostatic field is below the predetermined threshold level; and field generating means for selectively generating an electrostatic field exceeding the predetermined threshold level so as to localize the carriers within the semiconductor region to thereby selectively generate an output electrostatic force capable of use on an object.

18. A semiconductor electrostatic device according to claim 17; wherein the field generating means includes an electrode for inducing an electrostatic field and means for supplying a variable voltage to the electrode to electrically control the electrostatic field.

19. A semiconductor electrostatic device according to claim 17; wherein the field generating means includes means for generating a constant electrostatic field lower than the predetermined threshold level, and means for generating a variable electrostatic field lower than the predetermined threshold level which fields combine with each other to selectively apply an electrostatic field exceeding the predetermined threshold level to the active means.

20. A semiconductor electrostatic device according to claim 19; wherein the means for generating a variable electrostatic field includes means for variably regulating a distance between the active means and the field generating means in accordance with the level of the variable electrostatic field.

21. A semiconductor electrostatic device according to claim 17; further comprising control means for variably regulating a distance between the active means and the field generating means in accordance with the amount by which the electrostatic field exceeds the predetermined level.

22. A semiconductor electrostatic device according to claim 17; wherein the active means and the field generating means are physically opposed to each other, one of the active means and the field generating means comprises a movable member movable in response to the output electrostatic force and the other one of the active means and the field generating means comprises a stationary member such that the output electrostatic force induces relative movement between the active means and the field generating means.

23. A semiconductor electrostatic device according to claim 17; wherein the active means and the field generating means are relatively movable with respect to each other in accordance with the output electrostatic force so as to convert the electrostatic force into a mechanical displacement.

24. An electric switch having a movable contact actuable in response to an electrostatic field, the electric switch including the semiconductor electrostatic device in accordance with claim 17; wherein one of the active means and the field generating means is configured as the movable switch contact.

25. An optical device having a shutter means for selectively passing electromagnetic radiation actuable in response to an electrostatic field, the optical device including the semiconductor electrostatic device in accordance with claim 17; wherein one of the active means and the field generating means is configured as the shutter means.

26. A mechanical switch device including a valve actuable in response to an applied electrostatic field, the mechanical switch device including the semiconductor electrostatic device in accordance with claim 17; wherein one of the active means and the field generating means is configured as the valve.

27. A semiconductor electrostatic device according to claim 17; wherein the active means comprises a doped semiconductor material having an impurity concentration density in the range of $10^{15}/cm^3$ to $10^{21}/cm^3$.

28. A semiconductor electrostatic device according to claim 26; wherein the field generating means comprises a doped semiconductor material having an impurity concentration density in the range of $10^{15}/cm^3$ to $10^{21}/cm^3$.

29. A semiconductor electrostatic device according to claim 17; wherein the active means and the field generating means are physically opposed and spaced apart by a gap, and the output electrostatic force is inversely proportional to a value greater than a squared value of the gap distance between the active means and the field means.

30. A semiconductor electrostatic device according to claim 17; wherein the semiconductor region of the active means has a first surface receptive of a workpiece and wherein the field generating means includes means for selectively generating the electrostatic field to localize the carriers proximate the first surface of the semiconductor region to thereby selectively generate an electrostatic force effective to fix and hold the workpiece.

31. A semiconductor electrostatic device according to claim 17; further comprising means for positioning a workpiece having a given conductivity type in an opposed relationship from the active means, and means for detecting an interactive electrostatic force induced between the workpiece and the active means so as to detect the conductivity type of the workpiece.

32. A semiconductor electrostatic device for producing an electrostatic output force, comprising: active means having a semiconductor region containing carriers localizable along a surface thereof in response to an applied electric field exceeding a predetermined threshold level for producing an output electrostatic force; field generating means for generating an electric field and applying the electric field to the semiconductor region of the active means; and control means for controlling the electric field to selectively exceed the predetermined threshold level to localize the carriers within the semiconductor region to thereby produce an output electrostatic force.

33. A semiconductor electrostatic device according to claim 32; wherein the field generating means comprises an electrode for inducing an electric field; and the control means comprises means for supplying a variable voltage level to the electrode to electrically control the strength of the electric field.

34. A semiconductor electrostatic device according to claim 33; wherein the field generating means further comprises a semiconductor region containing carriers localizable along a surface thereof in response to an applied electric field exceeding the predetermined threshold level.

35. A semiconductor electrostatic device according to claim 33; wherein the active means further comprises an electrode for inducing an electric field in the semiconductor region; and the control means includes means for supplying a variable voltage level to each of the electrodes to electrically control the strength of the electric field.

36. A semiconductor electrostatic device according to claim 32; wherein the field generating means comprises a semiconductor region containing carriers localizable along a surface thereof in response to an applied electric field exceeding a predetermined threshold level; and the control means comprises means for supplying a variable voltage level to the semiconductor region to electrically control the strength of the electric field.

37. A semiconductor electrostatic device according to claim 32; wherein the active means comprises a movable member having a semiconductor region of a first conductivity type; the field generating means comprises a first stationary member having a first semiconductor region of the first conductivity type and a second stationary member having a second semiconductor region of a second conductivity type, the first and second stationary members being spaced apart and opposed from the movable member; and the control means includes means for supplying a variable voltage level to the respective semiconductor regions to control the strength of the electric field to selectively exceed the predetermined threshold level, such that the movable member is selectively caused to undergo movement toward and away from the first and second stationary members.

38. A semiconductor electrostatic device according to claim 32; wherein the active means comprises a movable member having a semiconductor region of a first conductivity type; the field generating means comprises at least one stationary member opposing the active means and having a semiconductor region containing carriers movable in response to an applied electric field exceeding the predetermined threshold level; and the control means includes means for supplying a variable voltage level to the respective semiconductor regions to control the strength of the electric field to selectively exceed the predetermined threshold level, such that the movable member is selectively caused to undergo movement toward and away from the at least one stationary member.

39. A semiconductor electrostatic device according to claim 38; wherein the semiconductor region of at least one stationary member has a second conductivity type.

40. A semiconductor electrostatic device according to claim 38; wherein the at least one stationary member comprises a pair of stationary members, the semiconductor region of one stationary member being of the first conductivity type and the semiconductor region of the other stationary member being of a second conductivity type.

41. A semiconductor electrostatic device according to claim 32; wherein the control means comprises means for variably regulating a distance between the active means and the field generating means to control the strength of the electric field.

42. A semiconductor electrostatic device according to claim 32; wherein the active means and the field generating means comprise a set of movable and stationary members operative to convert the generated output electrostatic force into a mechanical displacement of the movable member.

43. A semiconductor electrostatic device according to claim 42; wherein the movable member comprises a contact member of an electrical switch.

44. A semiconductor electrostatic device according to claim 42; wherein the movable member comprises a contact member of a mechanical actuator.

45. A semiconductor electrostatic device according to claim 42; wherein the movable member comprises a shutter.

46. A semiconductor electrostatic device according to claim 42; wherein the movable member comprises a movable valve member of a valve.

47. A semiconductor electrostatic device according to claim 32; wherein the active means is relatively movable with respect to the field generating means; and the active means and the field generating means comprise a pair of movable and stationary members operative to convert the output electrostatic force into a mechanical displacement of the movable member.

48. A semiconductor electrostatic device according to claim 32; wherein the field generating means comprises a housing having an internal chamber defining an inner wall having a pair of axially-spaced electrodes; the active means comprises a movable member slidably engaged with the inner wall; and the control means comprises means for selectively applying a bipolar voltage between the electrodes effective to induce an electric field exceeding the predetermined threshold level to cause the movable member to undergo axial displacement with respect to the inner wall.

49. A semiconductor electrostatic device according to claim 48; wherein the electrodes formed on the inner wall each have a semiconductor region of a first conductivity type and the movable member has a semiconductor region of a second conductivity type.

50. A semiconductor electrostatic device according to claim 48; wherein the inner wall of the housing is formed at least partially of a semiconductor material, and the electrodes comprise impurity-doped regions formed in the inner wall.

51. A semiconductor electrostatic device according to claim 48; further comprising a semiconductor thin film formed on the inner wall and having a pair of impurity-doped regions defining the axially-spaced electrodes.

52. A semiconductor electrostatic device according to claim 48; wherein the housing comprises a plurality of housings arranged in a plurality of rows and columns; the movable member comprises a plurality of movable members each corresponding to a respective housing; and the control means comprises a scanning circuit for sequentially selecting rows of respective housings, a driving circuit for selectively applying the bipolar voltage to the electrodes of selected columns of plural housings to cause the movable member of selected cylinders to undergo axial displacement, and a control circuit for synchronizing the scanning circuit and the driving circuit.

53. A semiconductor electrostatic device according to claim 32; further comprising a pair of support members formed with openings therethrough, and biasing means for biasing the active means in an at-rest position with respect to the support members; and wherein the field generating means comprises a stationary member having a semiconductor region of a first conductivity type disposed between the support members; the active means comprises a movable member slidably disposed between the support members and having an orifice passing therethrough and a semiconductor region of a second conductivity type; the biasing means includes means for biasing the active means such that the orifice is disposed in one of an aligned or non-aligned position with respect to the openings formed in the support members in an at-rest position; and the control means comprises means for applying a voltage to at least one of the stationary member and the movable member to induce an electric field in excess of the predetermined threshold level to cause the movable member to undergo displacement with respect to the stationary member to move the orifice to the other of the aligned or non-aligned position.

54. A semiconductor electrostatic device according to claim 32; further comprising a fluid guide member having an inner wall defining a central conduit for guiding a fluid therethrough; wherein the field generating means comprises a first semiconductor member having a first conductivity type and a first ion adsorptive film disposed along the inner wall of the conduit; the active means comprises a second semiconductor member having a second conductivity type and a second ion adsorptive film disposed along the inner wall; and the control means comprises detecting means disposed upstream of the active means and the field means along the inner wall of the conduit for detecting the presence of ions in a fluid and generating a voltage across the first and second semiconductor members effective to induce an electric field exceeding the predetermined threshold level so as to trap ions in the fluid with the ion adsorptive films.

55. A semiconductor electrostatic device according to claim 32; further comprising a fluid guide member having an inner wall defining a central cavity having first, second and third branches meeting at a confluence point, the first branch for introducing a first fluid, the second branch for introducing a second fluid, and the third branch for discharging a third fluid formed of components of the first and second fluids which are fused at the confluence point; wherein the active means comprises a first semiconductor member of a first conductivity type disposed proximate the confluence point; the field generating means comprises a second semiconductor member disposed proximate the confluence point so as to oppose the first semiconductor member; and the control means comprises a power source for applying a voltage across the first and second semiconductor members effective to induce an electric field exceeding the predetermined threshold level to create an output electrostatic force in the conduit at the confluence point effective to fuse components of the first and second fluids.

56. A semiconductor electrostatic device according to claim 32; further comprising a fluid guide member having an inner wall defining a central cavity having an inlet tube for introducing a fluid and a pair of outlet tubes for outputting components of the fluid separated at a branch point at which the three tubes meet; wherein the active means comprises a first semiconductor member of a first conductivity type disposed on the fluid guide member proximate the branch point; the field generating means comprises a second semiconductor member of a second conductivity type opposing the first semiconductor member and disposed on the fluid guide member proximate the branch point; and the control means comprise a power source for applying a voltage across the first and second semiconductor members effective to induce an electric field exceeding the predetermined threshold level to create an output electrostatic force in the conduit at the branch point to separate positively and negatively charged species of the first fluid.

57. A semiconductor electrostatic device according to claim 32; further comprising a fluid guide member having an inner wall defining a conduit for the passage of a fluid containing a mixture of cell species having a plurality of masses and charges; wherein the active means comprises a plurality of semiconductor elements disposed along the inner wall, each semiconductor element having a conductivity type associated with a polarity of a specific cell species of the fluid; the field generating means comprises a plurality of electrodes each for inducing an electric field in a respective semiconductor element; and the control means comprises means for supplying a variable voltage level to the respective electrodes to electrically control the electric field in each semiconductor element to effect alignment of the respective cell species.

58. A semiconductor electrostatic device according to claim 32; wherein the semiconductor region of the active means comprises a doped semiconductor material having an impurity density in the range of $10^{15}/cm^3$ to $10^{21}/cm^3$.

59. A semiconductor electrostatic device according to claim 57; wherein the field generating means comprises a doped semiconductor material having an impurity density in the range of $10^{15}/cm^3$ to $10^{21}/cm^3$.

60. A semiconductor electrostatic device according to claim 32; wherein the control means includes means for controlling the strength of the electric field so as to produce an output electrostatic force inversely proportional to a value greater than a square value of a gap distance between an opposed pair comprised of the active means and the field generating means.

61. A semiconductor electrostatic device according to claim 32; wherein the active means comprises a semiconductor member having a first surface receptive of a workpiece and a second surface; the field generating means comprises a field electrode disposed below the second surface of the semiconductor member; and the control means comprises means for selectively supplying a drive voltage to the field electrode to localize the carriers along the first surface of the semiconductor member to produce an output electrostatic force effective to attract and fix a workpiece.

62. A semiconductor electrostatic device according to claim 32; further comprising means for positioning a testpiece comprised of a doped semiconductor material in opposed relation to the active means, and means for detecting an interactive electrostatic force induced between the testpiece and the active means so as to discriminate a conductivity type of the doped semiconductor material.

63. A semiconductor electrostatic device according to claim 32; further comprising means for positioning a testpiece of a given conductivity type in opposed relation to the active means such that an interactive electrostatic force is induced by the localized carriers in accordance with the conductivity type of the testpiece, and sensing means for sensing the interactive electrostatic force to discriminate the conductivity type of the testpiece.

64. A semiconductor electrostatic device comprising: means for producing an electric field; and active means placed in the electric field and being operative to induce an output electrostatic force, the active means having a semiconductor region containing carriers which are excited by the electric field to localize along a surface of the semiconductor region to thereby generate the output electrostatic force; wherein the number of carriers which become localized along the surface of the semiconductor region increases at a greater rate when the electric field exceeds a predetermined threshold level than when the electric field is below the predetermined threshold level.

65. A semiconductor electrostatic device comprising: active means having a semiconductor region containing carriers movable in response to an applied electric field exceeding a predetermined threshold level; and field generating means for selectively generating an electric field exceeding the predetermined threshold level so as to localize the carriers along a surface of the semiconductor region to thereby selectively generate an output electrostatic force capable of attracting or repelling an object.

66. A semiconductor electrostatic device according to claim 65; wherein the field generating means includes an electrode for inducing an electric field and means for supplying a variable voltage to the electrode to electrically control the output electrostatic force.

67. A semiconductor electrostatic device according to claim 65; wherein the field generating means includes an electrode for inducing an electrostatic field, and means for supplying a variable voltage to the electrode to electrically control the output electrostatic force.

68. A semiconductor electrostatic device according to claim 65; wherein the field generating means includes means for generating a constant electric field lower than the predetermined threshold level, and means for generating a variable electric field lower than the predetermined threshold level which fields combine with each other to selectively apply an electric field exceeding the predetermined threshold level to the active means.

69. A semiconductor electrostatic device according to claim 68; wherein the means for generating a variable electric field includes means for variably regulating a distance between the active means and the field generating means in accordance with the level of the variable electric field.

70. A semiconductor electrostatic device according to claim 65; wherein the field generating means includes means for variably regulating a distance between the active means and the field generating means in accordance with the amount by which the electric field exceeds the predetermined threshold level.

71. A semiconductor electrostatic device according to claim 65; wherein the active means and the field generating means are physically opposed to each other, one of the active means and the field generating means comprises a movable member movable in response to the output electrostatic force, and the other one of the active means and the field generating means comprises a stationary member such that the output electrostatic force induces relative movement between the active means and the field generating means.

72. A semiconductor electrostatic device according to claim 65; wherein the active means and the field generating means are relatively movable with respect to each other in accordance with the output electrostatic force so as to convert the electrostatic force into a mechanical displacement.

73. An electric switch having a movable contact actuable in response to an electric field, the electric field including the semiconductor electrostatic device in accordance with claim 65; wherein one of the active means and the field generating means comprises the movable switch contact.

74. An optical device having a shutter for selectively passing electromagnetic radiation actuable in response to an applied electric field, the optical device including the semiconductor electrostatic device in accordance with claim 65; wherein one of the active means and the field generating means comprises the shutter.

75. A mechanical actuator including a movable valve member actuable in response to an applied electric field, the mechanical actuator including the semiconductor electrostatic device in accordance with claim 65; wherein one of the active means and the field generating means comprises the movable valve member.

76. A semiconductor electrostatic device according to claim 65; wherein the active means comprises a doped semiconductor material having an impurity concentration density in the range of approximately $10^{15}/cm^3$ to approximately $10^{21}/cm^3$.

77. A semiconductor electrostatic device according to claim 76; wherein the field generating means comprises a doped semiconductor material having an impurity concentration density in the range of approximately $10^{15}/cm^3$ to approximately $10^{21}/cm^3$.

78. A semiconductor electrostatic device according to claim 65; wherein the active means and the field generating means are physically opposed and spaced apart by a gap, and the output electrostatic force is inversely proportional to a squared value greater than a squared value of the gap distance between the active means and the field generating means.

79. A semiconductor electrostatic device according to claim 65; wherein the semiconductor region of the active means has a first surface receptive of a workpiece; and the field generating means includes means for selectively generating the electrostatic field to localize the carriers proximate the first surface of the semiconductor region to thereby selectively generate an electrostatic force effective to hold the workpiece.

80. A semiconductor electrostatic device according to claim 65; further comprising means for positioning a workpiece having a given conductivity type in an opposed relationship from the active means, and means for detecting an interactive force induced between the workpiece and the active means to detect the conductivity type of the workpiece.

81. An electrostatic actuator comprising: a movable member having a semiconductor region containing carriers localizable at a surface thereof in response to an applied electric field exceeding a first predetermined threshold level; a stationary member having a semiconductor region containing carriers localizable at a surface thereof in response to an applied electric field exceeding a second predetermined threshold level; and a power source for selectively driving at least one of the movable and stationary members with a driving voltage effective to induce an electric field in excess of the first or second predetermined threshold levels.

82. A semiconductor electrostatic actuator comprising: a stationary member; a movable member mounted to undergo physical displacement relative to the stationary member in response to an output electrostatic force; a semiconductor region disposed in at least one of the movable member and the stationary member, the semiconductor region containing carriers localizable along a surface of thereof in response to an applied electric field exceeding a predetermined threshold level; and an external connection terminal disposed on the at least one of the movable and stationary members having the semiconductor region for applying a voltage to the semiconductor region effective to induce an electric field in excess of the predetermined threshold level.

* * * * *